United States Patent [19]
Adams

[11] Patent Number: 6,141,732
[45] Date of Patent: Oct. 31, 2000

[54] BURST-LOADING OF INSTRUCTIONS INTO PROCESSOR CACHE BY EXECUTION OF LINKED JUMP INSTRUCTIONS EMBEDDED IN CACHE LINE SIZE BLOCKS

[75] Inventor: Phillip M. Adams, Salt Lake City, Utah

[73] Assignee: Novell, Inc., Provo, Utah

[21] Appl. No.: 09/118,718

[22] Filed: Jul. 17, 1998

Related U.S. Application Data

[60] Provisional application No. 60/079,185, Mar. 24, 1998.

[51] Int. Cl.[7] .................................................. G06F 12/08
[52] U.S. Cl. ........................................ 711/137; 712/225
[58] Field of Search ........................... 711/137; 712/225, 712/207

[56] References Cited

U.S. PATENT DOCUMENTS

| | | |
|---|---|---|
| 4,277,826 | 7/1981 | Collins et al. . |
| 4,583,166 | 4/1986 | Hartung et al. . |
| 4,811,215 | 3/1989 | Smith . |
| 4,926,322 | 5/1990 | Stimac et al. . |
| 5,023,776 | 6/1991 | Gregor . |
| 5,202,993 | 4/1993 | Tarsy et al. ............................. 395/700 |
| 5,237,669 | 8/1993 | Spear et al. ............................. 395/400 |
| 5,274,834 | 12/1993 | Kardach et al. ......................... 395/800 |
| 5,303,377 | 4/1994 | Gupta et al. ................................. 717/9 |
| 5,325,499 | 6/1994 | Kummer et al. ......................... 395/425 |
| 5,371,872 | 12/1994 | Larsen et al. ............................ 395/425 |
| 5,394,547 | 2/1995 | Correnti et al. ......................... 395/650 |
| 5,414,848 | 5/1995 | Sandage et al. ......................... 395/650 |
| 5,471,591 | 11/1995 | Edmondson et al. .................... 395/375 |
| 5,517,651 | 5/1996 | Huck et al. .............................. 395/775 |
| 5,553,305 | 9/1996 | Gregor et al. ........................... 395/826 |
| 5,555,398 | 9/1996 | Raman .................................... 395/470 |
| 5,642,493 | 6/1997 | Burgess ................................... 712/237 |
| 5,651,136 | 7/1997 | Denton et al. ........................... 394/445 |
| 5,652,889 | 7/1997 | Sites ........................................ 395/708 |
| 5,781,792 | 7/1998 | Asghar et al. ...................... 395/800.35 |
| 5,838,945 | 11/1998 | Emberson ............................... 712/200 |
| 5,944,815 | 8/1999 | Witt ......................................... 712/207 |
| 5,961,631 | 10/1999 | Devereux et al. ...................... 712/207 |

OTHER PUBLICATIONS

Gösmann, Klaus et al., *Code Reorganization for Instruction Caches*, IEEE, 1993, pp. 214–223.

Furht, B. et al.,*A Compiler–Directed Cache Strategy for GaAs Microprocessor Architectures*, IEEE, 1988, pp. 186–192.

Hsu, Wei–Chung et al., *A Performance Study of Instruction Cache Prefetching Methods*, IEEE Transactions on Computers, vol. 47, No. 5, May 1998.

(List continued on next page.)

*Primary Examiner*—Richard L. Ellis
*Attorney, Agent, or Firm*—Madson & Metcalf

[57] ABSTRACT

An apparatus and method for accelerating interpretive environments may burst-load selected blocks of instructions into a processor cache. In an illustrated example, an interpretive instruction set implementing a virtual machine is modified to include a jump instruction embedded in each interpretive instruction. Each of the jump instructions points to a successive interpreter instruction, and the last jump instruction is a return to the main program. The interpretive instructions are crafted to occupy a single cache line as a compiled, linked, and loaded image. Consequently, burst-loading is accomplished by pointing to the jump instruction within an initial interpretive instruction. The cache registers a miss when the processor attempts to load the jump instruction, and a MMU loads a main memory block containing the initial interpretive instruction into a cache line. The jump instruction is executed, which results in the MMU loading a successive interpreter instruction into a cache line. This process continues until the final interpretive instruction is loaded. The final jump returns control to the main program. In this manner, the entire interpretive instruction set is rapidly burst-loaded into the processor cache. The interpretive instruction set is preferably pinned or fenced within the cache, and the processor can thereafter execute instructions with low latency in an interpretive environment.

19 Claims, 12 Drawing Sheets

OTHER PUBLICATIONS

Young, Honesty C. et al., *On Instruction and Data Prefetch Mechanisms*, International Symposium on VLSI Technology, Systems, and Applications, May 31 to Jun. 2, 1995.

Zucker, Daniel F. et al., *An Automated Method for Software Controlled Cache Prefetching*, Proceedings of the 31$^{st}$ Annual Hawaii International Conference on System Sciences, IEEE, 1998, pp. 106–114.

Luk, Chi–Keung et al., *Cooperative Prefetching: Compiler and Hardware Support for Effective Instruction Prefetching in Modern Processors*, IEEE, 1998, pp. 182–193.

Margulis, "80386 Protected Mode Initialization," Dr. Dobb's Journal, pp. 36–39 (Oct. 1988).

Margulis, "Advanced 80386 Memory Management," Dr. Dobb's Journal, pp. 24, 28–30 (Apr. 1989).

Dudley, Jr., "Porting C Programs to 80386 Protected Mode," Dr. Dobb's Journal, pp. 16–18, 20 (Aug. 1990).

"Preemptible Cache Line Prefetch Algorithm and Implementation, " IBM Technical Disclosure Bulletin, vol. 33, No. 3B, pp. 371–373 (Aug. 1990).

Schulman, "Subatomic Programming," Dr. Dobb's Journal, pp. 137–139 (Mar. 1991).

"Generic BIOS Interrupt 13 Driver for Direct Access Storage Device," IBM Technical Disclosure Bulletin, vol. 37, No. 09, pp. 551–553 (Sep. 1994).

"Dual On–Chip Instruction Cache Organization in High Speed Processors," IBM Technical Disclosure Bulletin, vol. 37, No. 12 pp. 213–214 (Dec. 1994).

"Instruction Cache Block Touch Retro–Fitted onto Microprocessor," IbM Technical Disclosure Bulletin, vol. 38, No. 07 pp. 53–56 (Jul. 1995).

"Architecture of the Series 700 Bus," Hewlett Packared Manual excerpt, SPI Database of Software Technologies, ©1995 Software Patent Institute, 3 pages.

"An Experience Teaching a Graduate Course in Cryptography and Abstract and Introduction," 1996 Aviel D. Rubin excerpt, SPI Database of Software Technologies, ©1996 Software Patent Institute, 2 pages.

"An Experience Teaching a Graduate Course in Cryptography," 1996 Aviel D. Rubin excerpt, SPI Database of Software Technologies, ©1996 Software Patent Institute, pp. 7–10.

BURST-LOADING OF INSTRUCTIONS INTO PROCESSOR CACHE BY EXECUTION OF LINKED JUMP INSTRUCTIONS EMBEDDED IN CACHE LINE SIZE BLOCKS

This application claims benefit of Provisional Appl. 60/079,185 filed Mar. 24, 1998.

BACKGROUND

1. The Field of the Invention

The present invention relates generally to the acceleration of emulators and interpreters in processors having access to caches. More particularly, the present invention relates to methods of dynamically loading interpretive instructions into processor caches.

2. The Background Art

Operations executed by a processor of a computer proceed in a synchronization dictated by a system clock. Accordingly one characteristic of a processor is a clock speed. For example, a clock speed may be 33 megahertz, indicating that 33 million cycles per second occur in the controlling clock.

A processor may execute one instruction per clock cycle, less than one instruction per clock cycle, or more than one instruction per clock cycle. Multiple execution units, such as are contained in a Pentium™ processor, may be operated simultaneously. Accordingly, this simultaneous operation of multiple execution units, arithmetic logic units (ALU), may provide more than a single instruction execution during a single clock cycle.

In general, processing proceeds according to a clock's speed. Operations occur only as the clock advances from cycle to cycle. That is, operations occur as the clock cycles. In any computer, any number of processors may exist. Each processor may have its own clock. Thus, an arithmetic logic unit (ALU) may have a clock operating at one speed, while a bus interface unit may operate at another speed. Likewise, a bus itself may have a bus controller that operates at its own clock speed.

Whenever any operation occurs, a request for interaction is made by an element of a computer. Then, a transfer of information, setup of input/output devices, and setup of the state of any interfacing devices, must all occur.

Each controller of any hardware must operate within the speed or at the speed dictated by its clock. Thus, clock speed of a central processing unit does not dictate the speed of any operation of a device not totally controlled by that processor.

These devices must all interface with one another. The slowest speed will limit the performance of all interfacing elements. Moreover, each device must be placed in the state required to comply with a request passed between elements. Any device that requires another device to wait while some higher priority activity occurs, may delay an entire process.

For example, a request for an instruction or data within a hard drive, or even a main, random-access memory, associated with a computer, must negotiate across a main system bus. A central processing unit has a clock operating at one speed. The bus has a controller with a clock that may operate at another speed. The memory device has a memory management unit that may operate at another speed.

Further to the example, a Pentium™ processor having a clock speed of 100 megahertz may be connected to peripheral devices or main memory by an industry standard architecture (ISA) bus. The ISA bus has a specified clock speed of 8 megahertz. Thus, any time the Pentium™ processor operating at 100 megahertz requests data from the memory device, the request passes to the opposite side of the ISA bus. The data may not be processed or delivered at a speed greater than that of the bus at 8 megahertz. Moreover, a bus typically gives low priority to the central processing unit. In order to avoid underruns and overruns, the input/output devices receive priority over the processor. Thus, the 100 megahertz processor may be "put on hold" by the bus while other peripheral devices have their requests filled.

Any time a processor must access any device beyond its own hardware pins, the hardware interface to the computer outside the processor proper, the required task cannot be accomplished within one clock count of the processor. As a practical matter, a task is not usually completed in less than several clock counts of the processor. Due to other priorities and the speeds of other devices, as well as the need to adjust or obtain the state configurations of interfacing devices, many clock counts of a processor may occur before a task is completed as required.

Associated with every hardware interface between hardware components, elements, and the like (anything outside an individual integrated chip), a hardware handshake must occur for any communication. A handshake, including a request and an acknowledgment, must occur in addition to a transfer of actual data or signals. Handshake protocols may actually involve several, even many, clock counts for the request alone, the acknowledgment alone, and for passing the data itself. Moreover, a transmission may be interrupted by a transaction having a higher priority. Thus, communicating over hardware interfaces is relatively time consuming for any processor. Hardware interfacing may greatly reduce or eliminate the benefits of a high-speed processor.

To alleviate the need to communicate across hardware interfaces during routine processing, modem computer architectures have included processor caches. In general, processors benefit from maintaining as close to themselves as possible all instructions, data, and clock control. This proximity reduces the need for interfaces, the number of interfaces, the interface complexity, and thus, the time required for compliance with any instruction or necessary execution. Thus, caches have been moved closer and closer to the processor.

Memory caches are common. Such a cache is created within a dedicated portion of a memory device. These are different, however, from caches dedicated to a processor.

The INTEL 386™ processor contains an optional external cache connected to the processor through a cache controller chip. The INTEL 486™ contains an internal 8 kilobyte cache on the central processing unit itself. Within the chip containing the processor, is integrated a cache. This cache is dedicated to both code and data accesses.

The 486™ also supports another cache (a level-2 cache, as opposed to the primary or level-1 cache just described above). Access to the level-2 cache is through an external cache controller chip, similar to that of the 386™. In each case, for both the 386™ and 486™ processors, the external cache controller is itself positioned on a side of the processor's internal bus (CPU bus) opposite that of the processor.

The Pentium™ processors contain a level-1 (primary) data cache as well as a level-1 processor cache. Thus, code and data are segregated, cached separately. The Pentium™ processors continue to support an external, level-2 cache across a CPU bus.

One should understand that the expression "bus", hereinabove, refers to the processor bus, rather than the system bus. For example, the main system bus connects a processor to the main memory. However, the cache controllers and caches on a processor, or external to the processor but simply located across a processor's internal bus interface unit, do not rely on the main system bus.

A cache has some fixed amount of memory. A processor cache will contain certain executable instructions, a data cache will contain data, and a non-segregated cache may contain both. The memory of any type of cache is typically subdivided into cache lines. For example, a typical cache line may contain 32 bytes of information. Thus, a cache line contains a standard number of bytes in which space may be stored a copy of certain information obtained from a main memory device.

Associated with each cache line is a tag. The tag binds a physical address and a logical address corresponding to the contents of an associated cache line.

The physical and logical addresses contained in the tag associated with a cache line may correspond to a physical location in the main memory device, and a logical position within an application respectively.

Caches associated with a processor are transparent, even hidden, with respect to a user and an application. Each cache has an associated controller. In operation, a cache controller effectively "short circuits" a request from a processor to a memory unit. That is, if a particular address is referenced, and that address exists in a tag associated with the contents of a cache line in a cache, the cache controller will fulfill the request for the instruction out of the cache line containing it. The request is thus fulfilled transparently to the processor. However, the effect of a cache is to eliminate, as much as possible, communication through hardware interfaces as described above. Thus, a cache may greatly improve the processing speed of applications running on processors.

Tags may also have associated therewith two numbers referred to as "use bits." The use bits may typically represent a simple count of use. This count may be useful to the cache controller in determining which cache lines are the least recently used (LRU). Accordingly, a cache controller may refer to the LRU count to determine which cache lines have been referenced the least number of times.

Incidently, but significantly, with respect to the invention, some cache controllers may churn a cache. That is, if an insignificant number of bits is contained in the LRU or use bits, then a counter may be improperly reset to zero due to count "wrap-around" during high use. Thus, highly-used cache lines may actually be swapped out, churning the cache and dramatically decreasing efficiency.

Several difficulties exist with caches. A cache controller has a general purpose function to service address requests generally. For example, a virtual machine may be implemented in some limited number of instructions. In operating such a virtual machine, a computer processor has an underlying native language in which the virtual machine instructions are written. The virtual machine instructions will be requested repeatedly. The virtual machine instructions are accessed relatively slowly if they are treated simply as another general purpose instruction being retrieved periodically into the cache.

Cache Pinning

Interpretive environments are those which interpret high level language instructions on the fly into native machine code. One solution proposed to the above problems by the inventor is that interpretive environments are substantially benefitted by retaining or maintaining an interpreter composed of virtual machine instructions within a processor cache. Data caches are allowed to remain free to load and unload operational data as required. Under this scheme, explicit action must be taken to place the interpreter into the cache. Also, explicit action must be taken to "pin" the interpreter within the cache.

If the explicit action required to load, pin, and unpin the interpreter requires more execution cycles than execution of the desired application, then the fundamental assumptions about cache loading and pinning are flawed. Thus, repetitive switches between interpretive code and native code might actually increase the latency of interpreted instruction execution under this scheme.

For example, interpreters of high level languages for operating within native applications are receiving considerable attention. In particular, JAVA is being propounded as a platform-independent language, for which different interpreters may be designed for different hardware platforms. Abbreviated applications, nicknamed "applets" are being developed more and more frequently, and for a broad variety of useful functions.

Often, these applets are extremely short. Shorter applets result in a higher the percentage of overhead associated with loading and pinning the interpreter in the cache. One may conceive of an applet containing a near handful of instructions, perhaps ten to fifty. An early branch may be reached, terminating useful execution within perhaps five or ten execution steps. As a practical matter, many applications and applets are much longer. Nevertheless, this particular case points out that overhead becomes a greater percentage of processing time or number of cycles, as small utility applets become more widespread. Thus, to reduce overhead processing by the processor, quick and efficient loading and pinning procedures for an interpreter within processor cache needs to be addressed.

BRIEF SUMMARY AND OBJECTS OF THE INVENTION

In view of the foregoing, it is a primary object of the present invention to provide burst-loading of a virtual machine for increasing the loading speed, and thus supporting a cached configuration effective to improve execution speed of interpretive environments.

It is another object of the invention to provide programmatic control of burst-loading of executables stored in a processor cache.

It is another object of the invention to provide a set of virtual machine instructions forming a virtual machine, in which each of the compiled or assembled, linked, and loaded native code snippets or segments, including augmenting instructions effective to implement burst-loading, the entire set of instructions implementing a virtual machine instruction is sized to fit within a standard number of cache lines in a cache.

It is another object of the invention to provide a heuristic determination for pinning or fencing the contents of a cache programmatically by a processor.

It is another object of the invention to provide a main memory device containing data structures adaptable to be burst-loaded into a cache, cached, and optionally pinned or fenced, to be executed by a processor, without requiring repeated access to the main memory device for retrieval of any instruction.

It is another object of the invention to provide a virtual machine containing an augmented instruction, set made up of augmented instructions, each sized to fit completely within a cache line, to be addressable directly by cache line, with each augmented instruction effective to be loaded without execution, merely by execution of a single, jump instruction augmenting a virtual machine instruction to create the augmented instruction.

It is another object of the invention to provide a device having programmatic control over the content and of a cache, particularly a processor cache, and more particularly a level-1 processor cache, yet loadable rapidly by relying on the fundamental operation of the memory management unit associated with the processor, rather than test instructions, or even execution of the virtual machine instructions by fast-loading.

It is another object of the invention to provide a method to accelerate execution of an interpretive environment by copying instructions of an instruction set into the processor cache and pinning or fencing those instructions for the duration of the use by the processor of any instructions in the set, in order to increase the speed of processing the virtual machine instructions, eliminate cache misses, optimize pipelining within the processor, while minimizing supporting calculations such as those for addressing and the like.

Consistent with the foregoing objects, and in accordance with the invention as embodied and broadly described herein, an apparatus and method are disclosed in one embodiment of the present invention in which interpretive instructions are burst-loaded into cache.

For example, in one embodiment, an apparatus and method in accordance with the invention may "programmatically control" the contents of the cache. The cache may be loaded with a full set of virtual machine instructions, properly compiled or assembled, linked, and loaded. Each virtual machine instruction may be augmented with a jump instruction in machine-native code effective to jump to a next virtual machine instruction.

Each jump instruction points to another jump instruction in a next, adjacent virtual machine instruction. Thus, the jump instructions effect burst-loading of a processor cache.

Burst-loading is effected by pointing to a jump instruction augmenting a first virtual machine instruction in the native code implementation of that virtual machine instruction.

Thus, the memory management unit (MMU) of the processor searches for the jump instruction in cache. Upon initial execution, the cache does not contain the jump instruction. Accordingly, the MMU loads into the processor cache the virtual machine instruction to which the jump instruction pertains.

Since the jump instruction and the virtual machine instruction are located in the same block (corresponding to a cache line) of memory, that block will be loaded into the cache for quick access by the processor of the jump instruction which was pointed to. Since each jump instruction points to another jump instruction similarly augmenting a next, adjacent virtual machine instruction, the processor merely executes a series of jumps, while the MMU loads each block, corresponding to a virtual machine instruction, augmented by the jump instruction, into the cache.

Accordingly, an entire virtual machine may be burst-loaded into a cache, merely by execution of one jump instruction corresponding to each virtual machine instruction except for the last virtual machine instruction. The last virtual machine instruction is augmented by a return code, returning control of the processor to a routine that originally pointed to the jump instruction in the first virtual machine instruction.

The virtual machine is preferably of a length not to exceed a standardized specified number of cache lines, and is comprised of the executable, machine-language implementation of each augmented command or instruction provided in an interpretive environment. The set of virtual machine instructions, as augmented with burst-loading jump instructions, may be pinned or fenced within the processor cache.

Knowing that the MMU responsible for loading the cache will respond as designed, one may thus load all of the native code segments implementing the virtual machine instructions automatically into the cache in the fastest mode possible, controlled by the cache controller. Yet, the entire process is prompted by programmatic instructions, knowingly applied.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE PREFERRED EMBODIMENTS

It will be readily understood that the components of the present invention, as generally described and illustrated in the Figures herein, could be arranged and designed in a wide variety of different configurations. Thus, the following more detailed description of the embodiments of the system and method of the present invention, as represented in FIGS. 1 through 9, is not intended to limit the scope of the invention, as claimed, but it is merely representative of the presently preferred embodiments of the invention.

The presently preferred embodiments of the invention will be best understood by reference to the drawings, wherein like parts are designated by like numerals throughout.

Those of ordinary skill in the art will, of course, appreciate that various modifications to the details illustrated in the schematic diagrams of FIGS. 1–12 may easily be made without departing from the essential characteristics of the invention. Thus, the following description is intended only as an example, and simply illustrates one presently preferred embodiment consistent with the invention as claimed herein.

Figure 1:
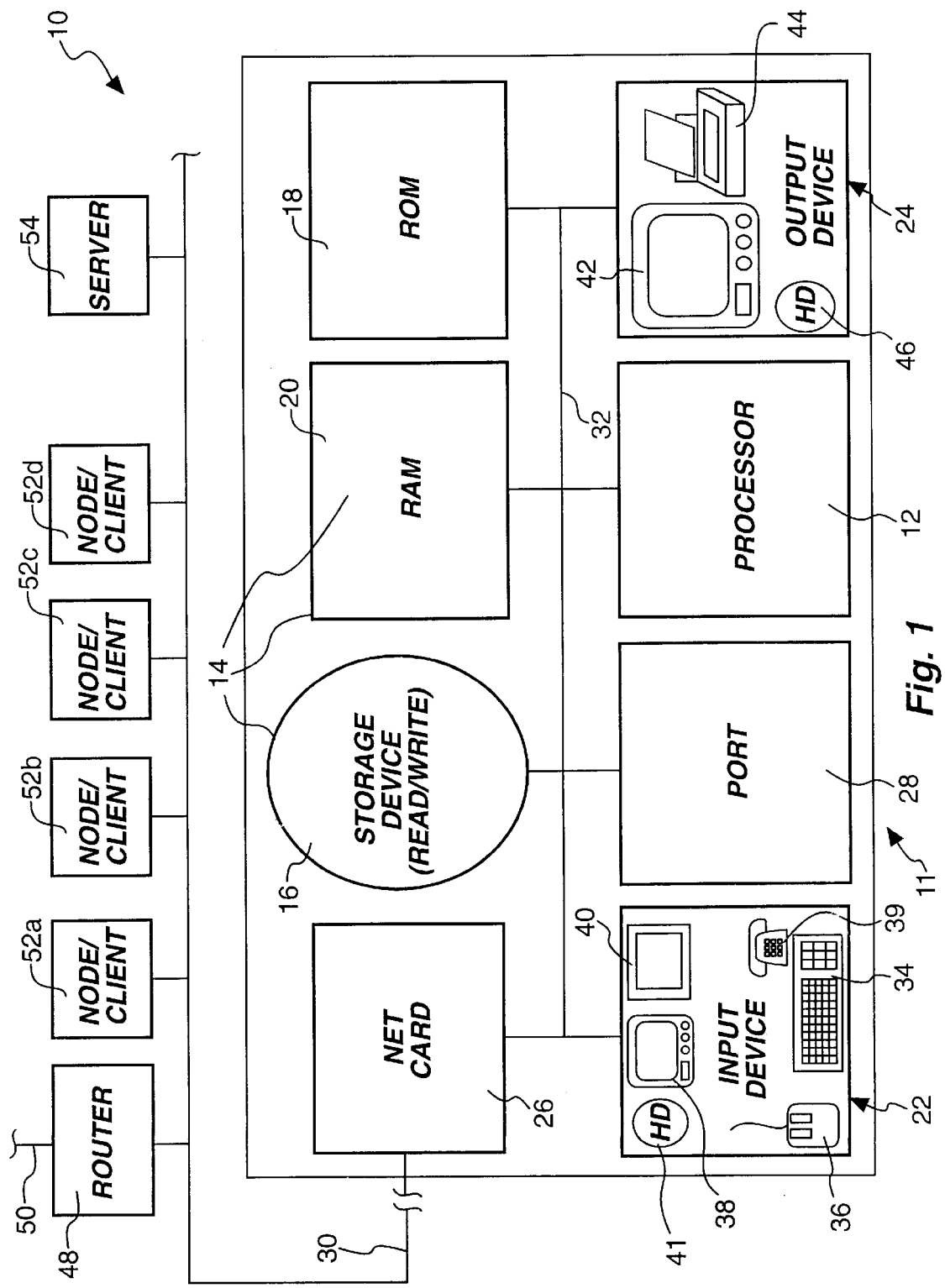
FIG. 1 is a schematic block diagram of an apparatus in accordance with the invention.
Figure 2:
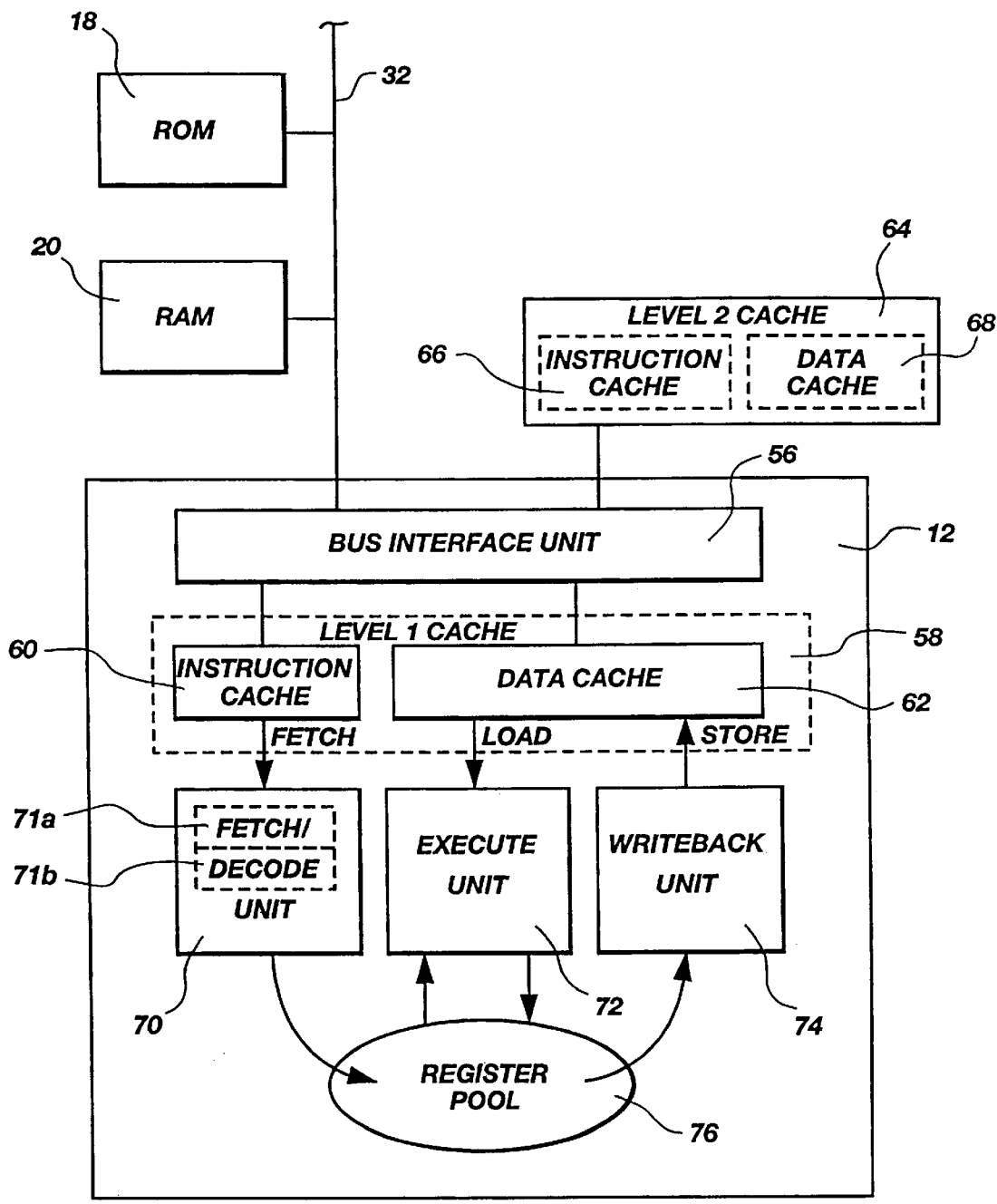
FIG. 2 is a schematic block diagram showing implementation details for one embodiment of the apparatus of FIG. 1.
Figure 3:
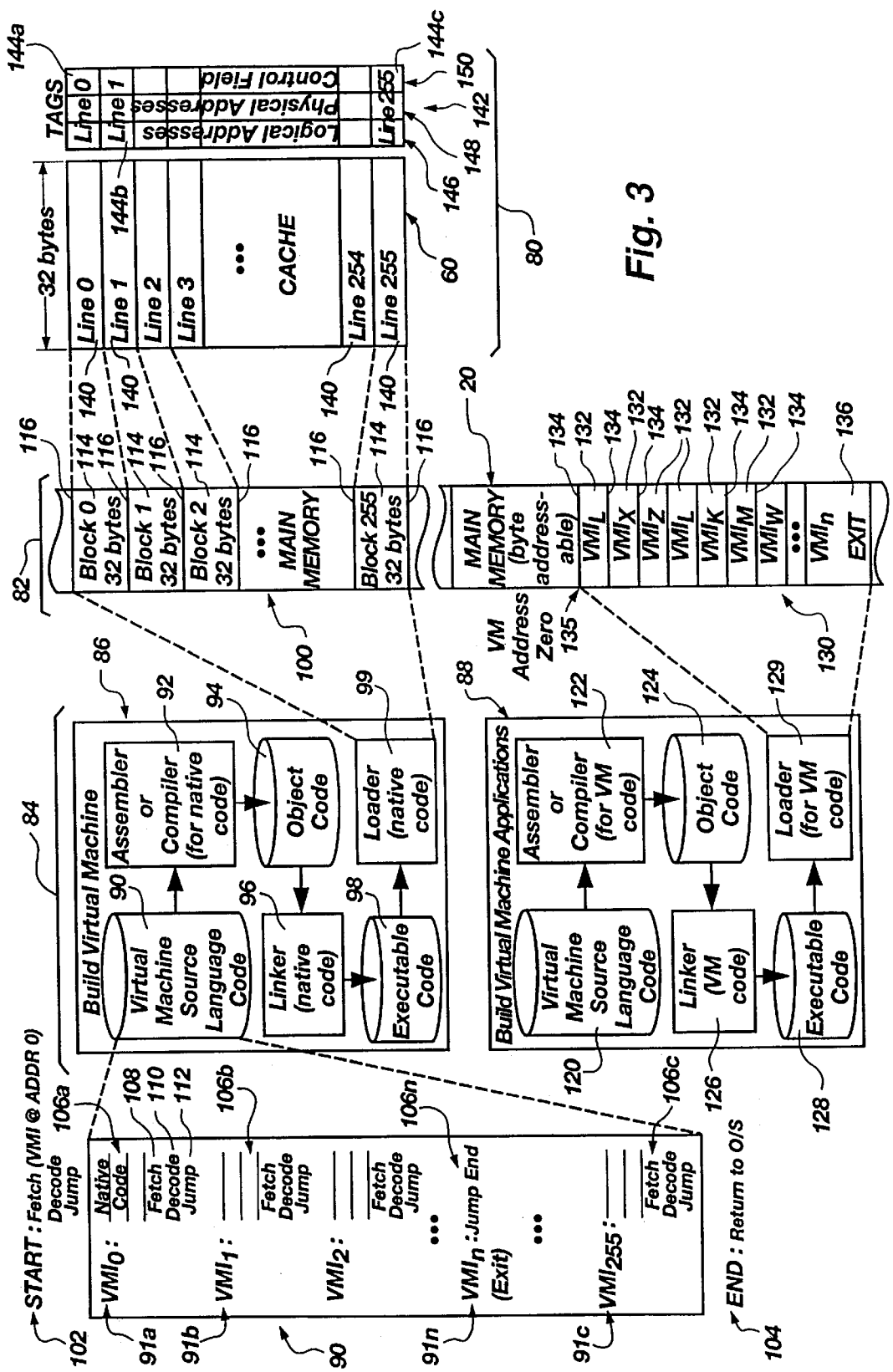
FIG. 3 is a schematic block diagram of executable modules and data structures consistent with one implementation of an apparatus and method in accordance with the invention.

Referring now to FIGS. 1–3, and more particularly, an apparatus 10 may include a node 11 (client 11, computer 11) containing a processor 12 or CPU 12. The CPU 12 may be operably connected to a memory device 14. A memory device 14 may include one or more devices such as a hard drive or non-volatile storage device 16, a read-only memory 18 (TOM) and a random access (and usually volatile) memory 20 (RAM).

The apparatus 10 may include an input device 22 for receiving inputs from a user or another device. Similarly, an output device 24 may be provided within the node 11, or accessible within the apparatus 10. A network card 26 (interface card) or port 28 may be provided for connecting to outside devices, such as the network 30.

Internally, a bus 32 (system bus 32) may operably interconnect the processor 12, memory devices 14, input devices 22, output devices 24, network card 26 and port 28. The bus 32 may be thought of as a data carrier. As such, the bus 32 may be embodied in numerous configurations. Wire, fiber optic line, wireless electromagnetic communications by visible light, infrared, and radio frequencies may likewise be implemented as appropriate for the bus 32 and the network 30.

Input devices 22 may include one or more physical embodiments. For example, a keyboard 34 may be used for interaction with the user, as may a mouse 36. A touch screen 38, a telephone 39, or simply a telephone line 39, may be used for communication with other devices, with a user, or the like. Similarly, a scanner 40 may be used to receive graphical inputs which may or may not be translated to other character formats. A hard drive 41 or other memory device 14 may be used as an input device whether resident within the node 11 or some other node 52 (e.g., 52a, 52b, etc.) on the network 30, or from another network 50.

Output devices 24 may likewise include one or more physical hardware units. For example, in general, the port 28 may be used to accept inputs and send outputs from the node 11. Nevertheless, a monitor 42 may provide outputs to a user for feedback during a process, or for assisting two-way communication between the processor 12 and a user. A printer 44 or a hard drive 46 may be used for outputting information as output devices 24.

In general, a network 30 to which a node 11 connects may, in turn, be connected through a router 48 to another network 50. In general, two nodes 11, 52 may be on a network 30, adjoining networks 30, 50, or may be separated by multiple routers 48 and multiple networks 50 as individual nodes 11, 52 on an internetwork. The individual nodes 52 (e.g. 52a, 52b, 52c, 52d) may have various communication capabilities.

In certain embodiments, a minimum of logical capability may be available in any node 52. Note that any of the individual nodes 52a–52d may be referred to, as may all together, as a node 52.

A network 30 may include one or more servers 54. Servers may be used to manage, store, communicate, transfer, access, update, and the like, any number of files for a network 30. Typically, a server 54 may be accessed by all nodes 11, 52 on a network 30. Nevertheless, other special functions, including communications, applications, and the like may be implemented by an individual server 54 or multiple servers 54.

In general, a node 11 may need to communicate over a network 30 with a server 54, a router 48, or nodes 52. Similarly, a node 11 may need to communicate over another network (50) in an internetwork connection with some remote node 52. Likewise, individual components 12–46 may need to communicate data with one another. A communication link may exist, in general, between any pair of devices.

Referring now to FIG. 2, a processor 12 may include several internal elements. Connected to the bus 32, a bus interface unit 56 handles the bus protocols enabling the processor 12 to communicate to other devices over the bus 32. For example, the instructions or data received from a ROM 18 or data read from or written to the RAM 20 may pass through the bus interface unit 56.

In some processors, a processor cache (e.g. cache 58,64), such as a level-1 cache 58 may be integrated into the processor 12. In specific embodiments of processors 12, such as the Pentium™ and Pentium™ Pro processors, as well as the PowerPC™ by Motorola, the level-1 cache 58 may be optionally subdivided into an instruction cache 60 and a data cache 62.

A level-1 cache 58 is not required in a processor 12. Moreover, segregation of the instruction cache 60 from the data cache 62 is not required. However, a level-1 cache 58 provides rapid access to instructions and data without resort to the main memory 18, 20 (RAM 20). Thus, the processor 12 need not access (cross) the bus interface unit 56 to obtain cached instructions and data.

Certain processors 12 maintain an external cache 64. The external cache 64 is identified as a level-2 cache in FIG. 2. Nevertheless, the level-2 cache 64 may be a level-1 cache if no level-1 cache 58 is present on the processor 12 directly. Similarly, the external cache 64 may or may not be segregated between an instruction cache 66 and a data cache 68. Any suitable processor cache may be used.

Execution, normally associated with a processor 12, is actually most closely related to a fetch/decode unit 70, an execute unit 72, and a writeback unit 74. Likewise, associated with each cache 58, 64, is typically an inherent, integrated, hardware controller. The cache controller may be thought of as control logic built into the cache hardware.

When the fetch unit 71a issues a request for an instruction, the request goes to the bus interface unit 56. The level-1 cache 58 makes a determination whether or not the request can be satisfied by data or instructions identified with the logical address requested from cached data and instructions.

If an instruction cannot be provided by the level-1 cache 58, the level-2 cache 64 may respond to the request. If the desired item (data or instruction) is not present in either the level-1 cache 58 or the level-2 cache 64, then the main memory 18, 20 may respond with the desired item. Once the request has been fulfilled by the fastest unit 58, 64, 20, 18 to respond with the desired item, the request is completed, and no other devices will respond.

Main memory may include the ROM 18, the RAM 20, or both. Nevertheless, many computers boot up using the contents of the ROM 18 and thereafter use the RAM 20 for temporary storage of data associated with applications and the operating system. Whenever "main memory" is mentioned, it is contemplated that it may include any combination of the ROM 18 and RAM 20.

Once an instruction is retrieved for the fetch unit 71a, the instruction is passed to the decode unit 71b. The fetch 71a and decode 71b are typically highly integrated, and perform in an overlapped fashion. Accordingly, a fetch/decode unit 70 is typical.

As a practical matter, the decode unit 71b may identify a current instruction to be executed. Identification may involve identification of what type of instruction, what type of addressing, what registers will be involved, and the like. The presence of the instruction in an instruction register, may itself stimulate execution on the next clock count.

Once identification of an instruction is completed by the decode unit 71b, an execute unit 72 may immediately process the instruction through low-level, control-loop hardware. For example, sequencers, registers, and arithmetic logic units may be included in an execute unit 72.

Each instruction as it is fetched, decoded, executed, and the like, may require interaction between an individual processing unit 70, 72, 74 and a register pool 76. The registers 76 (register pool 76) are hidden from programmers and applications. Nevertheless, the hardware architecture of the processor 12 provides a hardware logic governing interaction between the units 70, 72, 74 and between the registers 76 and the units, 70, 72, 74.

Upon completion of execution of an instruction, a writeback unit 74 may provide an output. Accordingly, the output may be passed to the bus interface unit 56 to be stored as appropriate. As a practical matter, a result may be stored in a cache 58 of a level-1 variety or in a level-2 cache 64. In either event, a writeback unit 74 will typically write through to the main memory 18, 20 an image of the result.

Modern processors 12, particularly the Pentium™ processors, use a technique called pipelining. Pipelining passes an instruction through each of the fetch/decode/execute steps undergone by that instruction as quickly as possible. An individual instruction is not passed completely through all of its processing steps before the next instruction in order is begun.

For example, a first instruction may be fetched, and on the next clock count another instruction may be fetched while the first instruction is being decoded. Thus, a certain parallel, although slightly offset in time, processing occurs for instructions.

An advantage of a method and apparatus in accordance with the invention is that instructions may be more effectively pipelined. That is, prediction routines have been built into hardware in the Pentium™ class of processors 12. However, prediction is problematic. Inasmuch as a branch may occur, within approximately every five machine code instructions on average, the pipeline of instructions will be in error periodically. Depending on the sophistication of a prediction methodology, one or more instructions in a pipeline may be flushed after entering a pipeline at the fetch unit 71a.

Referring now to FIG. 3, an interpreter, such as a set of interpretive instructions 91 implementing a virtual machine 90, on a processor 12 is illustrated schematically. Relationships are illustrated for caching 80 or a cache system 80 for storing loaded and executable instructions 106 (e.g. 106a) corresponding to the interpretive instructions 91 of a virtual machine 90 or other interpretive instruction set 90.

A virtual machine 90 may be built upon any available programming environment. Such virtual machines 90 may sometimes be referred to as interpreters, or interpreted systems. Alternatively, virtual machines 90 are sometimes referred to as emulators, wherein a set of interpretive instructions 91a–n may be hosted on a processor 12 of one type to mimic or emulate the functional characteristics of a processor 12 in a hardware device of any other type.

An application may be written to run on or in an environment created for a first hardware device. After the application is fully developed and operational, the application may then be "ported" to another machine. Porting may simply include writing a virtual machine 90 for the second hardware platform. Alternatively, an application may be developed in the native language of a first machine, and a single set 90 of interpretive instructions 91a–n may be created to emulate the first machine on a second machine. A virtual machine 90 is sometimes referred to as an emulation layer. Thus, an emulation layer or virtual machine 90 may provide an environment so that an application may be platform-independent. A JAVA interpreter, for example, performs such a function.

An executable 82 loaded into main memory 18, 20 contains the original images of the contents of the cache system 80. A building system 84 that may be thought of as an apparatus, modules running on an apparatus, or a system of steps to be performed by an apparatus, is responsible to build contents to be loaded into the executable 82.

A builder 86 may be tasked with building and loading an executable image 100 of a virtual machine 90. Similarly, a builder 88 may build an executable image 100, 130 of the instructions 106 implmenting an application written in the interpretive instructions 91 constituting the virtual machine 90. In general, the executable 100, 130 or executable image 100, 130 may repr sent any application ready to be executed by the execute unit 72 of the processor 12. One embodiment of an executable 100,130 or an image 100, 130 may be an application written specifically to prompt a high speed loading as described with respect to FIG. 4 below.

A virtual machine 90 or a set 90 of interpretive instructions 91 may contain an individual interpretive instruction (e.g. 91a, 91b, 91n) corresponding to each specific, unique function that mu be accommodated by the virtual machine 90. The interpretive instruction 91n, for example, provides the ability to terminate execution.

In FIG. 3, the builder 86 may include source code 90, virtual machine source code 90. The source code 90 may be assembled or compiled by an assembler 92 or compiler 92, as appropriate. The virtual machine may operate adequately, whether dependent on assembly or compilation. The assembler 92 or compiler 92 operates for native code. Native code, may be thought of as code executable directly on a processor 12 in the apparatus 10.

By native code indicated the processor-specific instructions 91 that may be executed directly by a processor 12. By directly is not necessarily meant that the native code is always written binary ones and zeros. Native code 106 may be written in a language to be assembled 92 or compiled 92 into object code 94 and to be eventually linked 96 into an executable 100 loaded for execution. Executables 100 may then be loaded 99 into a memory device 20, 18 for ready execution on or by an execute unit 72 of a processor 12. An executable 100 stored in a non-volatile storage device 16 may sometimes be referred to as an executable file. Once properly loaded 99 into the main memory 18, 20 associated with a processor 12 an executable 100 may be executed by a processor 12.

The assembler 92 or compiler 92 provides object code 94 in native code instructions. The object code 94 may be linked to library routines or the like by a linker 96. The linker 96 may provide all other supporting instructions necessary to run the object code 94. Thus, the linker 96 provides, as output, executable code 98. As a practical matter, the executable code 98 will be run directly from main memory 18, 20 as a loaded executable 100. Thus, a loader 99 may load the executable code 98 into main memory 18, 20 as the loaded code 100.

Code segments 106a–n are written in native code. When any code segment 106a–n (e.g. 106a, 106b, 106c, 106n) is executed, the result is the desired output from the corresponding interpretive instruction 91a–n (e.g. 91a, 91b, 91c, 91n, respectively). Interpretive instructions 91a–n identify every available function that may be performed by the virtual machine 90. The instructions 106a–n illustrate segments 106a–n, implementations in native code, executably the hardware, processor 12, that must produce the result associated with each individual interpretive instruction 91a–n.

Each of the code segments 106a–n contains a FETCH instruction 108 DECODE instruction 110 and JUMP instruction 112. The instructions 108–112 promote pipelining. Thus, the subject of each of the respective instructions decode 110, fetch 108, and JUMP 112 correspond to the very next instruction, the second next instruction, and the third next instruction, respectively, following an instruction 91a–n being executed and corresponding to a code segment 106a–n in question.

A interpretive instruction set 90 should include a HALT instruction 91n. Thus, an interpretive instruction 91n within the virtual machine 90 will contain a segment 106n of native code indicating to the processor 12 the fetching and decoding process for instructions used in all applications. The last interpretive instruction 91a–n contained within a loaded application 100, 130 is a HALT instruction 91n (106n).

In FIG. 3, the loaded executable 100 may be stored in a block 114 separated by block boundaries 116. In the Pentium™ class of processors, each block 114 contains 32 bytes of data. The instruction set 90 or virtual machine 90 contains no more than 256 interpretive instructions 91a–n. Accordingly, the code segments 106a–n, when compiled, linked, and loaded, may each be loaded by the loader 99 to begin at a block boundary 116, in one currently preferred embodiment. Thus, the number of blocks 114 and the size of each block 114 may be configured to correspond to a cache line 140 in the cache 60. Thus, an image of a code segment 106a–n, compiled, linked, and loaded for each interpretive instruction 91a–n, exists in a single cache line 140. Likewise, every such interpretive instruction 91a–n and its native code segment 106a–n has an addressable, tagged, cache line 140 available in the 256 cache lines.

In addition to the builder 86, a builder 88 may build any virtual machine application 120. In FIG. 3, the process of building an application 120 is illustrated. For example, a mock application may be constructed for the exclusive purposes of high-speed loading of the code segments 106 into the cache lines 140. In the embodiment shown, virtual machine source language code 120 or source code 120 may be written to contain instructions 91 arranged in any particular order. In general, instructions 91 are used by a programmer in any suitable order to provide and execute an application 120.

In an embodiment of an apparatus and method in accordance with the invention, the source code 120 may simply contain each of the interpretive instructions 91 in the virtual machine language. The source code 120 may be assembled or compiled by an assembler 122 or compiler 122 depending on whether the language is an assembled or a compiled language. The assembler 122 or compiler 122 generates (emits, outputs) virtual machine code. The output of the assembler 122 or compiler 122 is object code 124. The object code 124 may be linked by a linker 126 to produce an executable code 128. The executable code 128 may be loaded by a loader 129 into main memory 18, 20 as the loaded executable 100, 130.

The loaded executable 100, 130 is still in virtual machine code. Thus, an application developed in the virtual machine language must be run on a virtual machine. The virtual machine 90 is stored in the cache 60. The cache 60 may actually be thought of as any processor cache, but the closest cache to a processor 12, is capable of the fastest performance.

The loaded executable 100, 130 is comprised of assembled or compiled, linked, and loaded, virtual machine instructions 132. A main memory device 20 is byte addressable. Each of the virtual machine instructions 132 begins at an address 134. Thus, each virtual machine instruction 132 may be of any suitable length required. Nevertheless, a virtual machine address zero 135 may be identified by a pointer as the zero position in the virtual machine 100, 130. Each subsequent address 134 may thus be identified as an offset from the virtual machine zero 135. A last instruction 136 should be effective to provide an exit from the loaded executable 100, 130. Typically, loaded executables 100, 130 are executed in the order they are stored in the memory device 20.

The cache 60 has associated therewith a tag table 142. For each cache line 140, an appropriate tag line 144 exists (e.g. 144a, 144b, 144c). Associated with each tag line 144, is a logical address 146 corresponding to the address 134 of the cache line 140 in question. Likewise, a physical address 148 in a tag line 144 corresponds to an address 116 or block boundary 116 at which the code 114 is stored in the main memory 18, 20. A control field 144c may contain symbols or parameters identifying access rights, and the like for each cache line 140.

Thus, in general, a loaded executable 100, 130 (application 100, 130) has a logical address 134 associated with each virtual machine instruction 132. The logical address 134 associated with the beginning of an instruction 132 is bound by the tag table 142 to the physical address 116 associated with the executable code 100 associated with the corresponding code segment 106 whose compiled, linked, and loaded image is stored at the respective cache line 140 associated with the tag line 144 binding the logical address 134, 146 to the physical address 116, 148.

Figure 4:
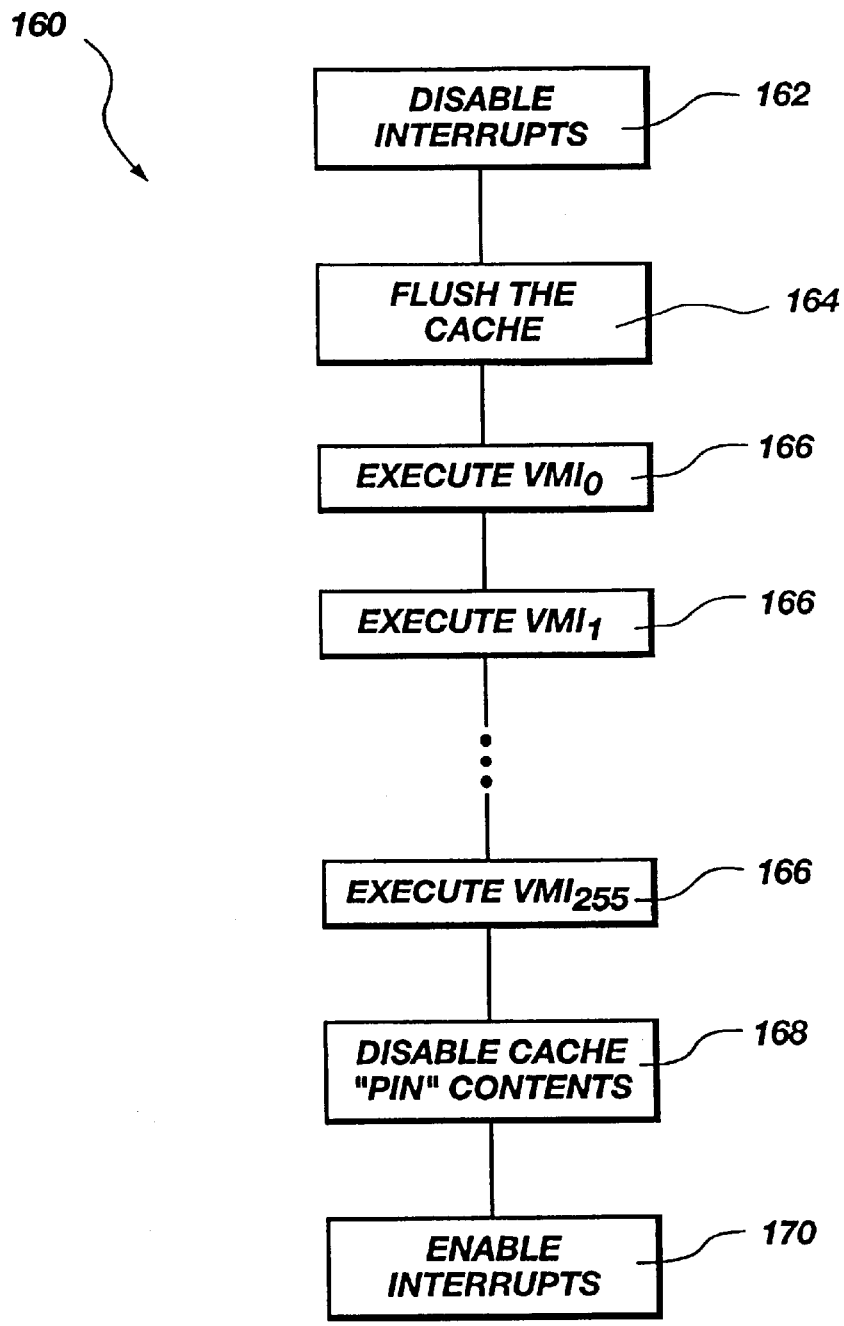
FIG. 4 is a schematic block diagram of a method in accordance with the invention.

Referring to FIG. 4, a method 160 is described and illustrated schematically. The method 160 locks or pins a cache after loading the native code implementation of individual virtual machine instructions into the cache.

A disable 162 may be executed by the processor to disable interrupts from being serviced. The disable 162 provides temporary isolation for the cache 60, enabling completion of the process 160 or method 160. The cache 60 is next flushed 164 typically with write-back, which causes "dirty" cache data to be written back to main memory 18, 20. Thus, in the control field 150 may be a byte indicating that each cache line 140 is available. Thus, the processor 12 need not thereafter execute the multiple steps to remove the contents of any cache line 140 in preparation for loading new contents.

The execute steps 166 correspond to execution by the processor 12 of individual instructions 132 in a loaded application 100, 130. Upon fetching for execution 166 each instruction 132, the processor 12 places a request for the instruction 132 next in order in the loaded application 100, 130.

The cache controller for the cache 60 first reviews the contents of the tag table 142 to determine whether or not the desired instruction is present in the cache 60. Having been flushed, the cache 60 has no instructions initially. Accordingly, with each execute 166, a new instruction 132 is loaded from the main memory 18, 20 into the cache 60 at some appropriate cache line 140. Immediately after loading into the cache 60, each instruction 132 in order is executed by the processor 12. However, at this point, any output is ignored. The execution 166 is simply a by-product of "fooling" the cache into loading all the instructions 132 as rapidly as possible, as pre-programmed into the hardware.

In one embodiment of an apparatus and method in accordance with the invention, a loaded application 100, 130 contains every instruction 132 required to form a complete set of instructions for a virtual machine. The instructions 132 are actually code segments 106 implementing a virtual machine instruction 91 in the native code of the processor 12. No output is needed from the initial application 100, 130 run during the method 160.

In one currently preferred embodiment of an apparatus and method in accordance with the invention, the virtual machine instruction set 100 is written so that each block 114 contains a single instruction 91. Moreover, the instruction set 90 is written to occupy exactly the number of cache lines 140 available in the cache 60.

In certain embodiments, an individual instruction 91 may occupy more than a single cache line 140. For example, some caches may have a 16 byte line length. Thus, a 32 byte length for an instruction 91 may require two cache lines 140. In one presently preferred embodiment, a number of cache lines 140 may correspond exactly to the number of blocks 114 required to hold all of the instructions 91, such that each instruction 91 may be addressed by referring to a unique cache line 140.

Thus, upon completion of execution of an initial application 100, 130 configured for loading the cache 60, no output may be provided. However, the cache 60 with its controller operating normally, loads every instruction 91 referenced by the application 100, 130. Therefore, each cache line 140 contains a code segment 106 or native code segment 106 implementing a virtual machine instruction 91. Each cache line 140 contains the code segment 106 corresponding to a virtual machine instruction 91 in a cache 60 having a line length of 32 bytes.

After the executions 166 of the virtual machine instructions 132 of the application 100, 130 designed for the loading of virtual machine instruction code 106 into the cache 60, a disable 168 may disable the cache 60. The effect of the disable 168 is to pin the contents of each cache line 140. Pinning (locking) indicates that the cache controller is disabled from replacing the contents of any cache line 140.

Nevertheless, the cache 60 continues to operate normally, otherwise. Thus, the controller of the cache 60 will continue to refer to the tag table 142 to determine whether or not an address 146, 148 requested is present. In the case of a virtual machine 90, every instruction 91 will be present in the cache 60, if the instructions are designed in accordance with the invention. Thus, the tag table 142 will always contain the code 106 associated with any address 146, 148 representing any virtual machine instruction 91.

Less than a full set of instructions 91 may be loaded into a cache 60. Alternatively, for a cache 60 having more cache lines 140 than needed for storing a virtual machine 90 in its entirety, unused cache lines 140 may be devoted to other code, loaded in a similar way, prior to pinning. Code may be selected according to recency of use, cost/benefit analysis of use, or cost/benefit analysis of retrieval from main memory 18, 20.

The cache 60 is used by way of example. The virtual machine 90 will operate fastest by using the cache 60 closest to the fetch/decode unit 70. Alternatively, another cache 64 may be used. Thus, everything describing the cache 60 may be applied to the cache 66 or the cache 64 so far as loading and pinning of the cache 60 are concerned. The enable 170 may re-enable the interrupts so that the processor 12 may resume normal operations.

Figure 5:
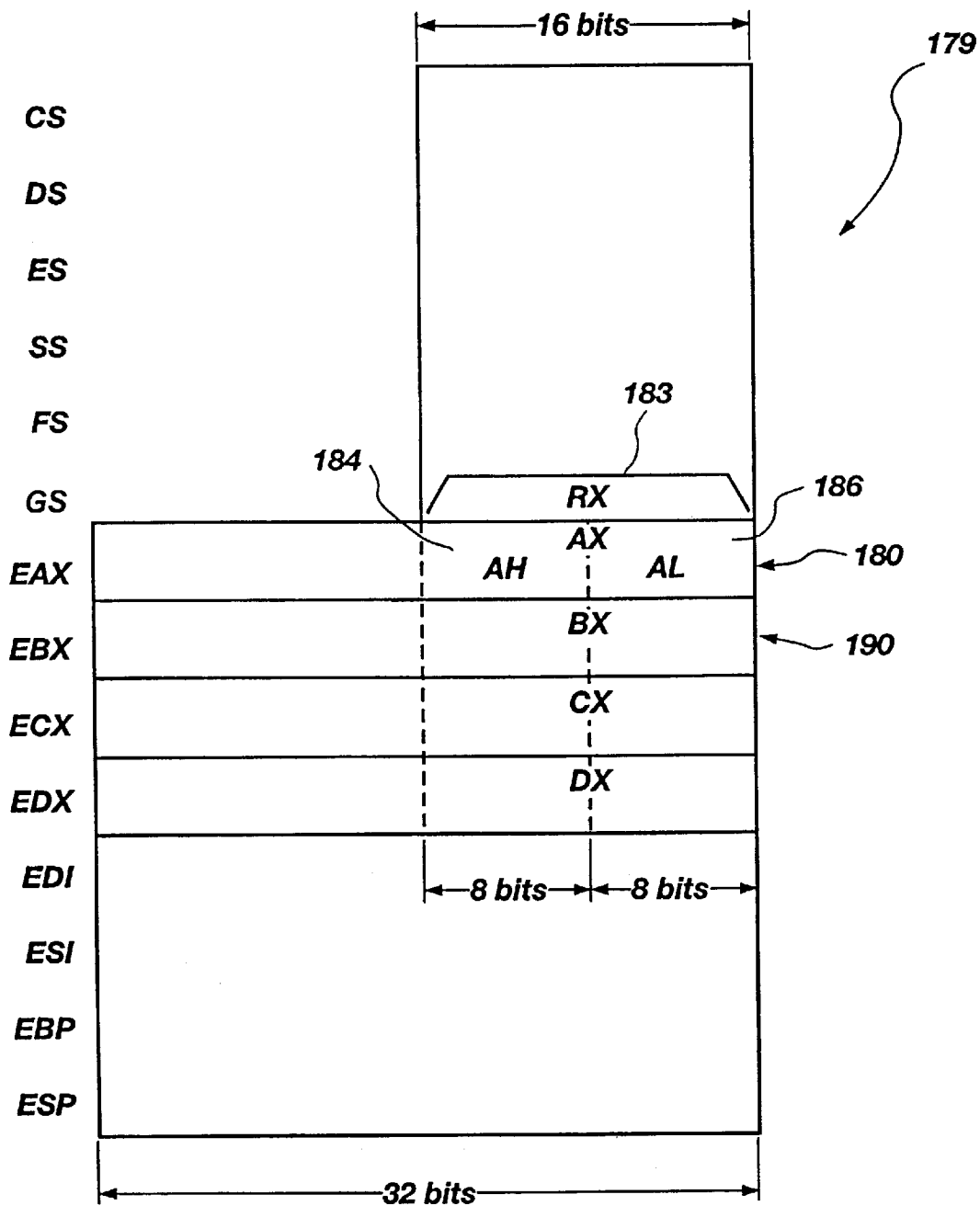
FIG. 5 is a schematic block diagram of registers used for addressing.

Referring to FIG. 5, an efficient fetch/decode/JUMP algorithm may begin with an XOR of the contents of a register EAX 180 against itself. The effect of the XOR is to zero out the contents of the EAX register 180. The contents of register EAX 180 may represent a pointer. Following this clearing operation, a MOVE instruction (MOV) may move the contents of a memory location corresponding to a pointer (next logical instruction number) and identified by the label or logical instruction number stored in a register EBX 190 into the register AL 186.

The register AL 186 is the lower eight bits of the AX register 182. The AX register 182 is the lower 16 bits of a 32 bit EAX register 180. The upper eight bits of the AX register 182 constitute the AH register 184. The AL 186 or lower register 186 thus receives the contents of a memory location corresponding to a current instruction 91 being pointed at by the contents of the EBX 190 register.

Following the MOVE instruction, a SHIFT instruction may shift left by five bits (effectively a multiplication by a value of 32) the contents of the EAX register 180. Since the EAX register 180 was zeroed out, and only the AL register was filled, a shift left of the EAX register 186 multiplies its value by 32. This shift left is effectively a decoding of the instruction that was fetched by the MOVE instruction.

Continuing with the procedure, a JUMP instruction may be implemented to position EAX in the set of virtual machine instructions. Note that each virtual machine instruction 91 in the complete set 90, when loaded, is written within the same number of bytes (32 bytes for the native code segment implementing the virtual machine instruction). The code segment 106 for each instruction 91 begins at a block boundary 116 and at the beginning of a cache line 140. Thus, a virtual machine instruction number multiplied by 32 will step through each of the native code segments 106. Thus, a JUMP to EAX constitutes a direct addressing of the native code segment 106 required to implement a particular virtual machine instruction 91.

Other mechanisms exist to address memory 20. For example, vector tables are commonly used. However, such mechanisms require certain calculations to occur in order to execute a JUMP. Moreover, memory access is required in order to complete the determination of a value in a vector table. Thus, the processor 12 must request access to the main memory 18, 20 in order to fulfill the request for a vector table entry. Accessing main memory and other operations requiring requests to be managed by the bus 32 may increase access times by more than orders of magnitude. The simple arithmetic logic unit operation of a JUMP in the preferred embodiment, is much more efficient than the vector table approach that imposes a memory reference on top of a simple JUMP operation.

Different types of caching implementations may exist in hardware. Three common types of cache architectures are direct-mapped, fully-associative, and a set-associative. Cache technology is described in detail in Computer Architecture: A Quantitative Approach by John L. Hennessy and David A. Patterson published in 1990 by Morgan Kaufman Publishers, Inc. of San Mateo, Calif. (See Chapter 8).

In an apparatus and method in accordance with the invention, any type of cache 60 may be used. In one currently preferred embodiment, a two-way set associative cache 60 may be used.

In a direct-mapped cache 60, several blocks or lines 140 exist. A cache line 140 may contain some selected number of bytes, as determined by the hardware. Typical cache lines 140 have a length of 16 or 32 bytes. Likewise, each cache structure will have some number of addressable lines. An eight bit addressing scheme provides 256 cache lines in a cache.

Each byte of memory within a memory device 14, including read/write types as well as read-only types, especially a main random access memory device 20, is directly addressable. One common caching scheme for a direct mapped cache architecture may map a memory device 20 to cache lines 140 by block. The memory's addressable space may be subdivided into blocks, each of the same size as a cache line. For example, an entire random access memory 20 may be subdivided into 32-byte blocks for potential caching.

A significant feature of a direct-mapped cache is that every block of memory within the source memory device 20 has a specific cache line 140 to which it will be cached any time it is cached. In one scheme, the least significant bits in an address corresponding to a block within a memory device may be truncated to the same size as the address of a cache line 140. Thus, every block of memory 20 is assigned to a cache line 140 having the same least significant bit address.

In a fully-associative, caching architecture, no binding need exist between any particular block of memory in the memory device, and any cache line *a priori*. Allocation is of a cache line 140 space to a particular block of memory 20 is made as needed according to some addressing scheme. Typical schemes may include random replacement. That is, a particular cache line 140 may simply be selected at random to receive an incoming block to be cached.

Alternative schemes may include a least-recently-used (LRU) algorithm. In a least-recently-used (LRU) scheme, a count of accesses may be maintained in association with each cache line 140. The cache line 140 that has been least recently accessed by the processor 12 may be selected to have its contents replaced by a incoming block from the memory device 20.

A set-associative architecture subdivides an associative cache into some number of associative caches. For example, all the lines 140 of a cache 60 may typically be divided into groups of two, four, eight, or sixteen, called "ways." Referring to the number of these ways or subcaches within the overall cache 60, as n, this subdivision has created an n-way set-associative cache 60.

Mapping of block-frame addresses from a main memory device 20 to a cache line 140 uses the associative principle. That is, each way includes an $n^{th}$ fraction of all the available cache lines 140 from the overall cache 60. Each block from the main memory device 20 is mapped to one of the ways. However, that block may actually be sent to any of the cache lines 140 within an individual way according to some available scheme. Either the LRU or the random method may be used to place a block into an individual cache line 140 within a way.

For example, a main memory address may be mapped to a way by a MODULO operation on the main memory address by the number of ways. The MODULO result then provides the number of a "way" to which the memory block may be allocated. An allocation algorithm may then allocate the memory block to a particular cache line 140 within an individual way.

Another cache may be used, with less effective results. Loading and pinning may also be done using test instructions, although more time-consuming. Instead of test instructions, the proposed method flushes the cache, running a simple application 100, 130 containing every VMI 91 of a desired set 90 to be loaded. Before disabling the processor cache 60, the method may use the cache's internal programming, built into the fundamental hardware architecture, to provide a high-speed load. Disabling permits access to the processor cache 60, but not replacement, completing an effective pinning operation.

In one currently preferred embodiment, the closest cache to the processor is used as the processor cache 60. For example, in the Pentium™ processor, the level-1 processor cache 60 may be used. In other embodiments, an external cache 64, or a level-1 integrated (not segregated between code and data) cache 58 may be used. Thus, whenever a processor cache 60 is specified, any cache 58, 60, 64 may be used, and the closest is preferred.

Pinning is particularly advantageous once an environment, or rather the executable instructions constituting an environment, have been programmed in a form that fits the entire instruction set into an individual processor cache 60, with one instruction corresponding to one cache line 140. Benefits derived from this method of architecting and pinning the virtual machine are several.

For example, no cache line 140, during execution of a virtual machine 90, need ever be reloaded from main memory 18, 20. In addition to the time delay associated with having to access the bus 32, access times within memory devices 14 themselves vary. Typically, a cache access time is an order of magnitude less than the access time for a main memory location. Reloading a cache line 140 is likewise a time-consuming operation.

Here, every branch destination (the object of a JUMP) within the virtual machine 90 may be located at a fixed cache line position. Thus, no penalty is created for address generation within the cache 60 itself. Rather, each cache line 140 may be addressed directly as the address of the instruction 91 being requested.

That is, typically, a cache controller must manage an addressing algorithm that first searches for a requested reference within the cache. If the reference is not present, then the cache controller requests over the bus 32 from main memory the reference. The address generation, management, and accessing functions of the cache controller are dramatically simplified since every desired address is known to be in the cache for all code references.

Many modern processors such as the Pentium™ series by INTEL™ contain hardware supporting branch prediction. That is, when a branch operation is to be executed, the processor predicts the destination (destination of a JUMP) to which the branch will transfer control. With a pinned cache containing the entire instruction set 90 of the virtual machine 90, all branch destinations are known. Every instruction has a cache line 140 associated therewith which will never vary. Not only does this correspondence not vary within a single execution of the virtual machine, but may actually be permanent for all loadings of the virtual machine.

Likewise, a branch prediction table is typically updated along with cache line replacement operations. Since the cache lines 140 need never be replaced while the virtual machine is loaded into the cache, and pinned, the branch prediction table becomes static. Inasmuch as the prediction table becomes static, its entries do not change. Moreover, every referenced code instruction is guaranteed to be in the cache. Therefore, any benefits available to a branch prediction algorithm are virtually guaranteed for an apparatus and method operating in accordance with the invention. Flushes of the pipelined instructions now approach a theoretical minimum.

In the Pentium™ processor by INTEL™, two arithmetic logic units (ALUs) correspond to a 'U' pipeline and a 'V' pipeline. Each arithmetic logic unit (ALU) may execute an instruction with each clock count. However, if two instructions must occur in sequence, then one pipeline may be idled. Thus, the 'V' pipeline may be idled during any clock count that requires two instructions to be executed in sequence rather than in parallel.

Typical optimal programming on Pentium™ processors may achieve 17 to 20 percent pairing between instructions. By pairing is meant that instructions are being executed in both the 'U' and 'V' pipelines. Here that occurs about 17 to 20 percent of the time in a Pentium™ processor.

Due to the careful architecture of the instruction set, as well as pinning the instruction set, a method and apparatus in accordance with the invention may routinely obtain 60 percent utilization of the 'V'(secondary) pipeline. The selection and ordering of the virtual machine instructions have been implemented to optimize pairing of instructions through the pipelines.

Figure 6:
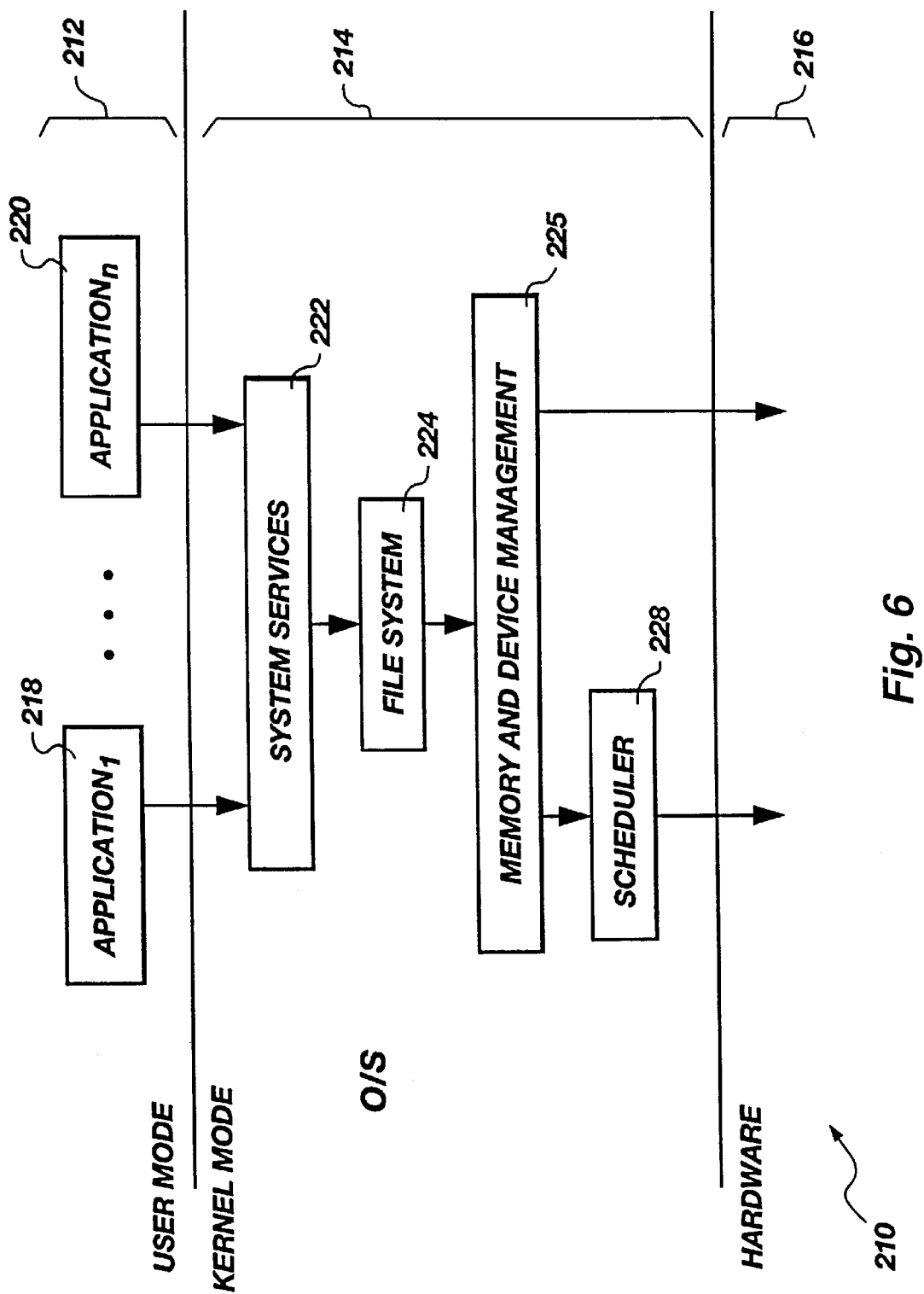
FIG. 6 is a schematic block diagram of an operating system that may be executed by the processor of FIG. 1.

Referring to FIGS. 6–9, as well as FIGS. 1–3, when multi-tasking, competing processes may try to use the processor 12 and the processor cache 60. A virtual machine application 120 may run in an interpretive environment 90 (the virtual machine 90) that is one among several native-code applications 218, 220 (FIG. 6).

In general, a small fraction of available processing time may be required for execution of native code 128 implementing a virtual machine application 120. This time is fragmented across the entire time line of a processor 12, shared by all multi-tasked processes.

A method 160 and apparatus 10 to pin a processor cache 60 for a user of a virtual machine 90 hosted on a computer 11 (individual) are taught previously herein. Pinning into individual cache lines 140 the code segments 106 implementing the individual instructions 91 of the virtual machine 90 dramatically improves the processing speed for virtual machine applications 120 (applications operating in the virtual machine environment 90).

However, if a virtual machine 90 is pinned, consuming the entire processor cache 58 of a multi-tasking operating system 214, it eliminates the availability of the processor cache 64 to service other native-code applications 218, 220. In a multi-tasking environment, this may degrade performance significantly. A virtual machine application 120, by its very presence, may degrade the operation of the entire panoply of applications 218, 220 (including itself) being executed by the processor 12.

Meanwhile, pinning and unpinning by any conventional method would add processing overhead, burdening the carefully constructed cache contents to render less favorable performance.

Here, the need is to load, pin, run, and then unpin rapidly and frequently for interpretive applications 120 in order to provide a faster execution of all applications 218, 220 running. Otherwise, the pinned processor cache 60 will degrade performance of all native-code applications 218, 220. For example, in one test, multi-tasked, native-code applications 218, 220 ran 3 to 5 times slower with a pinned processor code cache 60.

The invention contemplates very fast loading and pinning. A mock application 120 may serve to load all the VMI code segments 100 into the respective cache lines 140.

Figure 7:
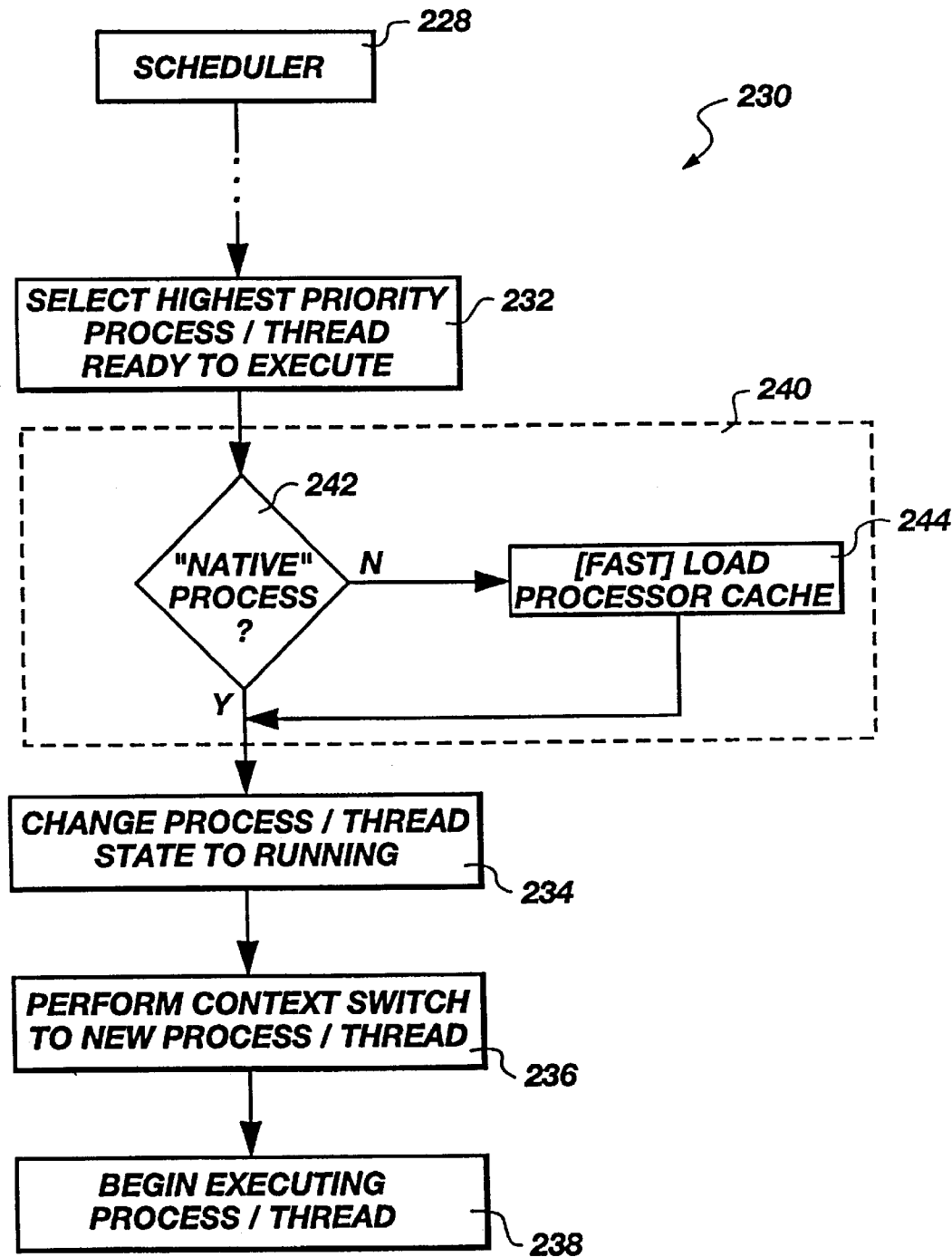
FIG. 7 is a schematic block diagram of processes occurring in a scheduler of FIG. 6, illustrating hooking a pin manager therein.

Referring to FIG. 7, a hooked pin manager 240, in a scheduler 228, executing a scheduling process 230 in an operating system 214 may control persistence of the contents of a processor cache 60. Persistence may encompass the enabling of the processor cache and the interrupts.

By hooking, is meant the process of altering the control flow of a base code, in order to include an added function not originally included in the base code. Hooks are often architected into base codes with the intention of permitting users to add customized segments of code at the hooks. Customized code might be added directly at the hook, or by a call or jump positioned as the hook within a base code.

Here, a hook into the scheduler 228 need not be an architected hook. For example, the scheduler 228 may have a jump instruction added surgically into it, with a new "hooked" code segment placed at the destination of the jump, followed by the displaced code from where the jump was written in, and a return.

Alternatively the scheduler 228 may be modified at some appropriate jump instruction, having an original destination, to jump to the destination at which is located a "hooked" code segment, such as a pin manager. Thereafter, the pin manager may, upon completion of its own execution, provide a jump instruction directing the processor 12 to the original destination of the "hooked" jump instruction.

Referring now to FIG. 6, certain processes 212, 214, 216 or modes 212, 214, 216 are illustrated for an apparatus 10 with an associated processor 12. In general, applications 218, 220, in some number may be executing in a multi-tasking environment hosted by a processor 12. The applications 218, 220 operate at a user level 212 or a user mode 212. Accordingly, the applications 218, 220 are "visible" to a user.

Below a user level 212 is an operating system level 214. The operating system level 214 may also be referred to as kernel mode 214.

The operating system (O/S) 214 is executed by the processor 12 to control resources associated with the computer 11. Resources may be thought of as hardware 10 as well as processes available to a computer 11. For example, access to memory 18, 20, storage 16, I/O devices 22, 24, peripheral devices 28, and operating system services 222 are all controlled resources available in a computer system. Functional features such as serving files, locking files or memory locations, locking processes into or out of execution, transfer of data, process synchronization through primitives, executing applications and other executables, may all be controlled as process resources by the operating system 214.

Applications 218, 220 at a user level 212 may communicate with a systems services module 222 or systems services 222 in an operating system 214. The system services 222 may provide for communication of a request from applications 218, 220 and for eventual execution by the processor 12 of those tasks necessary to satisfy such requests.

A file system 224 may provide for addressing and accessing of files. System services 222 may communicate with the file system 224 as necessary. Meanwhile, the file system 224 may communicate with a memory and device management module 226. Each of the modules 222, 224, 226, 228 may be thought of as one or more executables within an operating system 214 for accomplishing the mission or responsibilities assigned according to some architecture of the operating system 214. Whether or not a module exists as a single continuous group of executable lines of code is not relevant to the invention. Any suitable mechanism may be used to provide the functionality of the system services 222, while system 224, memory and device management 226, and the scheduler 228.

The memory and device management module 226 may control a MMU 225 associated with a memory device 14 or the main memory 20. Likewise, the device management function of the memory and device management module 226 may control access and operation of the processor 12 with respect to input devices 22, output devices 24, and other devices that may be connected peripherally through the port 28.

The scheduler 228 provides for scheduling of the execution of the processor 12. Accordingly, the scheduler 228 determines what processes or threads will be executed by the processor 12. The hardware level 216 may include any or all of the components of the computer 11 controlled by the operating system 214.

Figure 8:
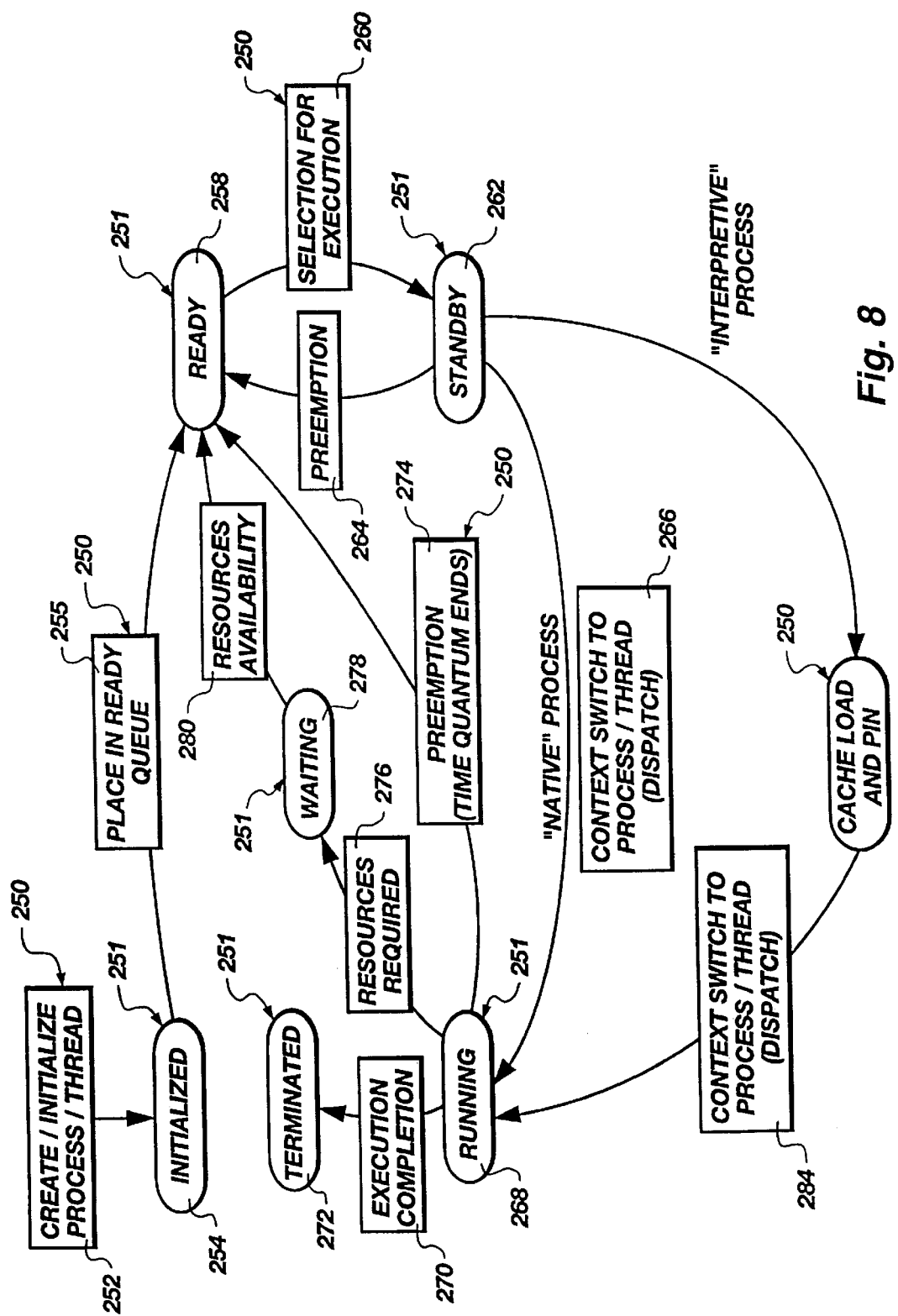
FIG. 8 is a schematic block diagram of an alternative representation of processes of FIG. 7 illustrating states of a process or thread executed by the processor in accordance with the scheduler.
Figure 9:
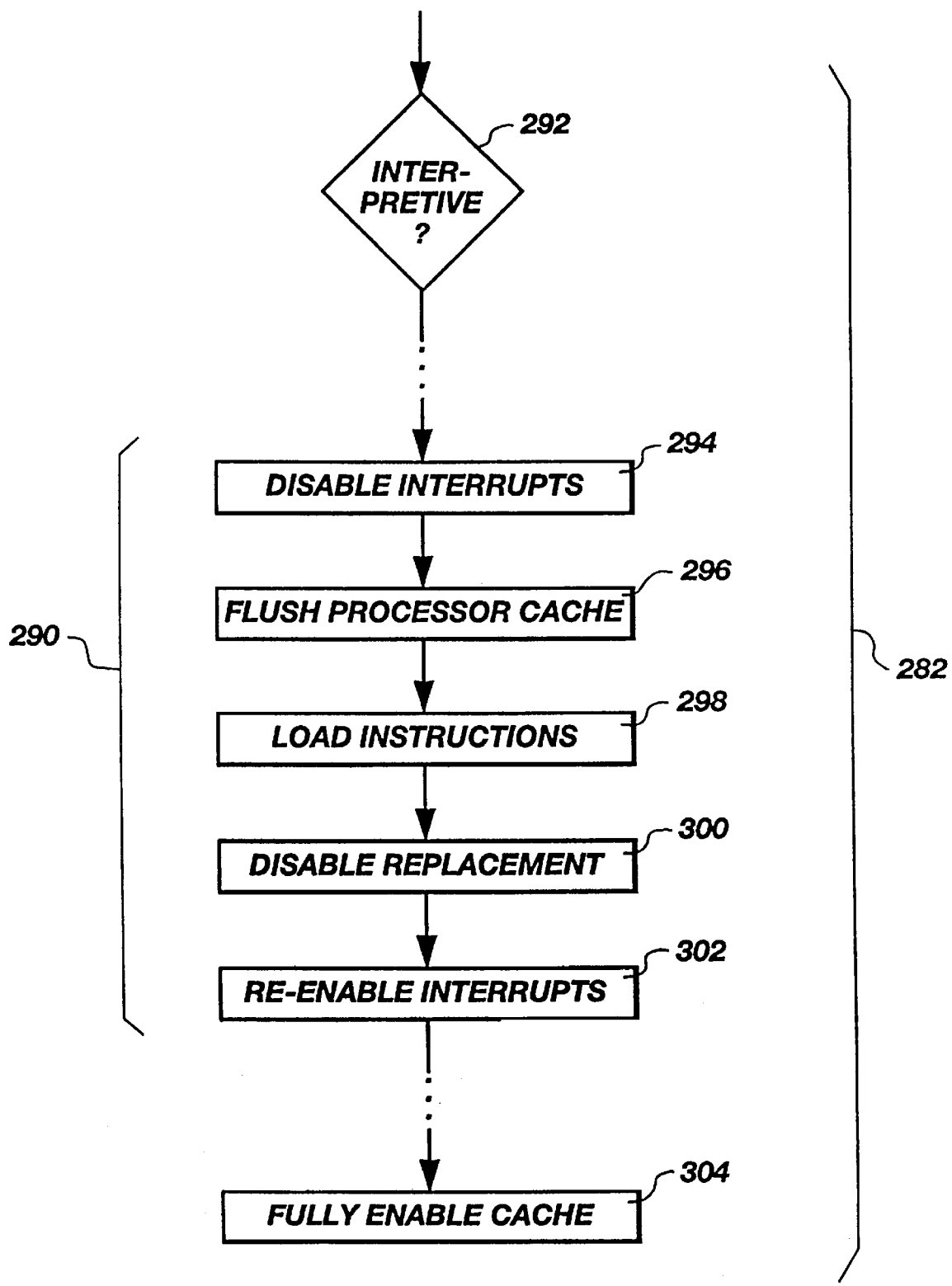
FIG. 9 is a schematic block diagram of steps associated with a pin manager, generalizing the fast loading process of FIG. 4, and adapting it to a multi-tasking environment.

Referring now to FIGS. 7–9, the scheduler 228 may provide for execution of certain processes 160 (see FIG. 4), 230 (see FIG. 7), 250 (see FIG. 8), 290 (see FIG. 9). For example, the processes 250 represented in rectangular boxes may be executed by the processor 12 in advancing a particular thread, process, program, or application between various states 251.

Referring now to FIG. 7, the scheduler 228 may give control of the processor 12 to the process 230. The process 230 may select 232 a process or thread having a highest priority among such processes or threads, and being in a ready state 258.

A change 234 may follow the select 232 in order to convert the selected process or thread to a running state 268. A context switch 236 may be performed to support the selected process or thread. A context switch may involve a setup of particular components in the hardware level 216 required to support a selected process or thread.

Following the context switch 236, the selected process or thread may execute 238. In a multi-tasking environment, the process or thread may not execute to completion with one continuous block of time in control of the processor 12. Nevertheless, a selected process or thread may execute 238 until some change in the associated state 251 occurs, or until some allocated time expires.

The process 230 may have an interposed process 240 hooked into it. In one embodiment, the interposed process 240 may include a test 242. The test 242 may determine whether or not a selected process or thread is a native process or not. A native process may operate in native code. A non-native process may operate in some other environment such as an interpretive environment. The test 242 may therefore determine whether a virtual machine 90 needs to be loaded into the processor cache 60.

A load process 244 may execute with a selected process or thread. The load process 244 may be implemented in any suitable manner. In one currently preferred embodiment of an apparatus and method in accordance with the invention, the load 244 may use a fast load process 160. However, in general, test instructions or any other mechanism may be used to perform a generic load process 290. A fast load process 160 requires substantially fewer instructions and less time in execution by the processor 12. As explained above, the fast load process 160 takes advantage of the architecture of the hardware level 216 to load a processor cache 60 in the minimum amount of time.

Referring to FIG. 8, an alternate view of the processes 250 and the associated states 251 associated therewith are illustrated. An initialize process 252 may create or initialize a selected process or thread. The selected process or thread will then be in an initialized state 254.

The processor 12, when time and resources become available, may queue 256 a process or thread into a ready state 258. From the ready state 258, a selection 250 may occur for a process or thread having a highest priority. The selection 250 may be thought of as corresponding to a select 232.

A selection 250 may advance a process or thread selected to a standby state 262. Nevertheless, priorities may shift. Thus, a preemption 264 may move a selected process or thread from a standby state 262 to a ready state 258.

In normal operation, a context switch 266 may occur to dispatch a process or thread from a standby state 262 to a running state 268. A running state 268 indicates that a selected thread or process has control of the processor 12 and is executing. One may think of the standby state 262 as existing between the selection 250 process and the context switch 266 process. From a different perspective, the select step 232 and the change step 234 of FIG. 7 may correspond to the selection 250 and context switch 266, respectively. In normal operation, an executing process or thread may move from a running state 268 to a terminated state 272 if completion 270 occurs. Execution completion 270 frequently occurs for any given process or thread since an available quantum of time allocated for a running state 268 in often sufficient for completion 270. Nevertheless, another frequent occurrence is a requirement 276 for resources. For example, the process or thread may need some input device 22 or output device 24 to perform an operation prior to continued processing. Accordingly, a requirement 276 may change a process or thread to a waiting state 278.

The availability 280 of resources may thereafter advance a process or thread from a waiting 278 to a ready state 258. Alternatively, expiration of the quantum of time allocated to the running state 268 of a thread or process may cause a preemption 274. The preemption 274 step or procedure may return the thread or process to the ready state 258 to be cycled again by a selection 250.

In one currently preferred embodiment of an apparatus and method in accordance with the invention, a cache load and pin process 282 (cache load 282, load 282) may precede a context switch 284, corresponding to the context switch 266 for a native process. The load 282 occurs only for interpretive processes as detected by the test 242 executed between the select step 232 (e.g. selection 250) and the change step 234 (e.g. context switch 284). A context switch 266, 284 may be thought of as operating on affected registers, such as by saving or loading context data, changing the map registers of the MMU 225, and the like, followed by changing the state of the processor 12 between one of the states 251.

The load 282 may be completed by any suitable method. For example, notwithstanding their less desirable approach, test instructions may be used to fashion a load process 282. Nevertheless, the process 160 (see FIG. 4) may properly be referred to as a fast load process 160 or a fast load 160 of a processor cache 60.

The effect of adding a load step 282 (driver 282, pin manager 282) before a context switch 284 is to set up an environment (e.g. virtual machine 90) in which to execute an interpretive application 218 (see FIG. 6) such as a virtual machine application 120 (see FIG. 3). One may note that a selection 250 of a native process or thread results in the immediate context switch 266 as the subject process or thread transitions from a standby state 262 to a running state 268. Accordingly, the processor cache 60 operates normally for any native process following the context switch 266. By contrast, a dynamic load and pin process 282, such as the fast load 160, may be executed very rapidly prior to a context switch 284 prior to placing an interpretive process or thread into a running state 268.

Referring to FIG. 9, an alternative embodiment of a load and pin process 282 (e.g. interposed process 240) is illustrated. A test 292 may determine whether or not a process resulting from a selection 260 is an interpretive process. The test 292 may be hooked in any suitable location among the processes 250. A flag may be set to determine whether or not to activate or hook a load and pin process 282 in any procedure occurring between a standby state 262 and a running state 268. However, in one currently preferred embodiment, the interposer routine 240 (see FIG. 7) may be hooked into the select 232 (e.g. selection process 260) or the context switch process 266. In one currently preferred embodiment, the entire interposer routine 240 may be hooked as the cache load and pin process 282 in the context switch 284, but before any substantive steps occur therein. The context switch 284 may be different from the context switch 286 for a native process or thread.

Thus, in one currently preferred embodiment, the load 282 (processor cache 60 load and pin process 282) may be as illustrated in FIG. 9. Meanwhile, a portion 290 of the load 282 may be replaced by the fast load 160. Note that the disable 294 may correspond to a disable 162 and the re-enable 302 may correspond to the enable 170 of interrupts. Similarly, the flush 296 may correspond to the flush 164 described above. The load instructions step 298 may or may not correspond to the execute 166 of the fast load 160. Any suitable method may be used for the load 298. The example mentioned before, using test instructions, is completely tractable. The fast load 160 using execution of a mock application 120 architected to use every instruction of a 91 of a virtual machine 90 in order to load each of the native code segments 106 corresponding thereto is simply the fastest currently contemplated method for a load 298.

Likewise, the disable 300 corresponds to a disable 168. However, the disable 300 specifically disables only the ability of a cache controller to change the contents of a cache line 140 in the processor cache 60 is affected. In all other respects, the processor cache 60 may operate normally following the re-enable 302 of interrupts. Thus, the enable 304 of the processor cache 60 may not be required as a separate step in certain embodiments. For example, the re-enable 302 with only a limited disable 300 may fully enable 304 a processor cache 60. However, in certain embodiments, such as when using test instructions, an extra enable step 304 may be required to return all the functionality to a processor cache 60. Again, note that by processor cache 60 is meant any of the caches 58, 60, 64 for use by the processor, although a segregated, processor cache 60, closest to the processor is one preferred embodiment.

Referring to FIGS. 7–9, the pin manager 240, 282 may be added at an operating systems (O/S) level 214 as a driver 226 (see FIG. 6) or contained in a driver 282 recognized and allowed by the O/S to be loaded by the O/S. This driver is at a systems level 214 of privilege. A reason why the pin manager is a driver is that this is a way to obtain systems level privileges. The O/S loads the driver 240, 282, and allows the driver 240, 282 to initialize 252, transferring control to an initialization routine 252.

As part of the initialization routine 252, the driver 240, 282 either hooks, or creates hooks to later hook into, the operating system 214. It is important to note that the driver 240, 282 is in control of the processor 12, once loaded, and the O/S 214 has turned over control to the driver and its initialization routine 252, until that control is returned. Drivers 226 have a standard set of commands that may be executed. Drivers 226 also recognize certain commands receivable from the O/S 214.

The pin manager 282 could not communicate with the processor cache 60 absent this systems privilege level, nor could it attach (hook) itself into the O/S 214. Thus, the pin manager 240, 282, by being a driver 226, fitting the device driver formats and protocols, may be recognized by the O/S 214. This recognition is not available to an application 218, 220. With this recognition, the pin manager 240, 282 (driver 240, 282) is designated as privileged-level code and can therefore contain privileged-level instructions of the processor 12.

Certain instructions may exist at multiple privilege levels. However, each such instruction is treated differently, according to the associated privilege level. For example, a MOVE instruction may mean the same in any context, but may only be able to access certain memory locations having corresponding, associated, privilege levels.

The interrupt disable 162, 294 (CLI instruction), flush 164, 296 (FLUSH or WBFLUSH), disable cache 168, 300, and enable cache 304 are privileged level instructions. They are available in the operating system environment 214 (privileged or kernel mode 214) to systems programmers writing operating systems 214, device drivers 226, and the like. So long as a user is authorized at the appropriate privilege level 214, the instructions are directly executable. If a user is not at the required level 214 of privilege, then the processor 12 generates an "exception" to vector off to an operating system handler to determine what to do with an errant program using such instructions improperly.

Typically, to disable 168, 300 or to turn a cache on or off requires a user, such as a system programmer, to execute a setup routine directly controlling the Basic Input/Output System (BIOS). This operation is not usually undertaken. Disabling 168, 300 a processor cache 60 is not routinely done, and to do so selectively is counter-intuitive.

Moreover, to repeatedly disable 168, 300 and re-enable 304 the processor cache 60 is folly by conventional wisdom. Likewise, to dynamically enable 304, load 298, and disable 162, 300 the processor cache 60 is highly counter-intuitive. However, in accordance with the invention, conventional wisdom is superceded to good effect.

The expressions "dynamic pinning" 282 and "programmatic management" of a processor cache 60 reflect the exercise, at run time, of control of both cache contents and their duration in accordance with the individual needs determined for a specific program 218, 220.

A major benefit of dynamic pinning 298 of a processor cache 60 is an ability to manage the loading 298 and pinning 300 of a virtual machine 90 (VM, interpretive environment 90) in a processor cache 60 (e.g. level-1 processor cache 60) in order to optimize the entire workload of a processor 12. This also maximizes the speed of the virtual machine 90 when run.

A processor cache 60 (or 58, 64) may be any cache adapted to store instructions executable by a processor. The cache may be segregated or not segregated, to have a portion for instructions and a portion for data. Perhaps the most significant feature of a processor cache 58, 60, 64 is the lack of direct programmatic addressing as part of the main memory address space. The processor cache 58, 60, 64 is thus "hidden" from a programmer.

Typically, pre-programmed instructions associated with the architecture of a processor cache 58, 60, 64 determine what is loaded into each cache line 140, when, and for how long. This is typically based on an LRU or pseudo-LRU replacement algorithm. The instant invention relies on direct programmatic controls, and knowledge of the cache architecture to prompt the processor cache 60 to store a certain desired set of contents for use by a specified program. Thus, careful programmatic controls may obtain certain reflexive responses from the processor cache 60 and its internal cache controller, which responses are manipulated by a choice of programmatic actions.

Algorithmic management of a hardware cache on a processor 12, has never allowed "dynamic programmatic control" of a hidden cache. Here, the use of knowledge of the architected response of the cache hardware system 60 programmatically optimizes the processor cache 60 behavior, as the processor cache 60 responds to privileged programmatic commands at an operating system level 214.

Visible caches (memory/RAM caches) exist, such as those for use by databases. However, prior art systems do not pin "invisible" processor caches at a hardware level.

Interpreters 90 are typically designed as a fixed set 90 having a fixed number of interpretive instructions 91, commonly referred to as bytecodes 91, or opcodes 91. Each virtual machine instruction 91 or routine 91 is designed to perform some function specified by an opcode 91or bytecode 91. Associated with each such routine 91 or interpretive instruction 91 is a control loop responsible to fetch 71a each next interpretive instruction 91 (or bytecode 91) stored in the memory 20 of the interpreter's 90 data space 100, 130. Next, the decode step 71a interprets the interpretive instruction 132 (opcode or bytecode 91) and selects the interpretive routine 91 that will perform the execution 72 of the interpretive instruction 132. Finally, the execute unit 72 executes the interpretive routine 91. These steps are repeated in a control loop until the interpretive program 100, 100, 130 is finished or an error occurs.

In an apparatus and method in accordance with the invention, each of the interpretive routines 91 is designed to fit within a single cache line 140 of a cache 60 (see FIG. 3). Each of the interpretive routines 91 also includes a PC-relative jump 310 to the next interpretive routine 91. The relative jump 310 is positioned at the end or bottom of the routine 91 associated with the instruction 132. With these two features, a virtual machine 90 may be completely loaded into a processor cache 60 by executing no more than a sequence of PC-relative jumps 310. Each of the jumps 310 has the effect of initializing an entire cache line 140. The cache line 140 affected is loaded with the specified interpretive routine 91 associated with a particular jump 310.

If deterministic loading of a processor cache 60, 66 is required, than flushing 164 the processor cache 60, 66 prior to executing a chain or sequence of PC-relatives jumps 310 is required. In deterministic loading, a same processor cache line 140 is loaded with a same corresponding interpretive routine 91 every time.

In short, the execution of loading a processor cache 60, 66 for interpretive environments may be reduced to execution of a number of PC-relative jumps corresponding to the number of interpretive instructions 91, opcodes 91, bytecodes 91. In order to pin 250 the virtual machine instruction set 90 in a processor cache 60, 66 certain privileged instructions are required. However, in the case of the INTEL Pentium processors 12 it is sufficient to disable the cache 60, 66. Disabling the cache 60, 66 does not disable the functionality of the cache 60, 66. Rather, disabling the cache merely disables updates to the cache 60, 66. However, such operation by the cache 60, 66 without being written over occurs only when executing with system level privileges. This corresponds with RING 0 on INTEL Processors 12.

In an apparatus and method in accordance with the invention, this problem may be solved by having an interpreter 90 that executes in a user-mode. That is, the interpreter 90 invokes an operating service (IOCTL) that passes the address of the chain of PC-52-relative jumps to a driver that immediately begins execution by the processor 12 at the specified, destination address 312, for example. A cache disabling instruction may be placed at the end of a chain of jumps 322. Also at the end of the jumps 322 will be a return instruction 314. The return instruction 314 will complete a user-mode IOTCL request.

Figure 10:
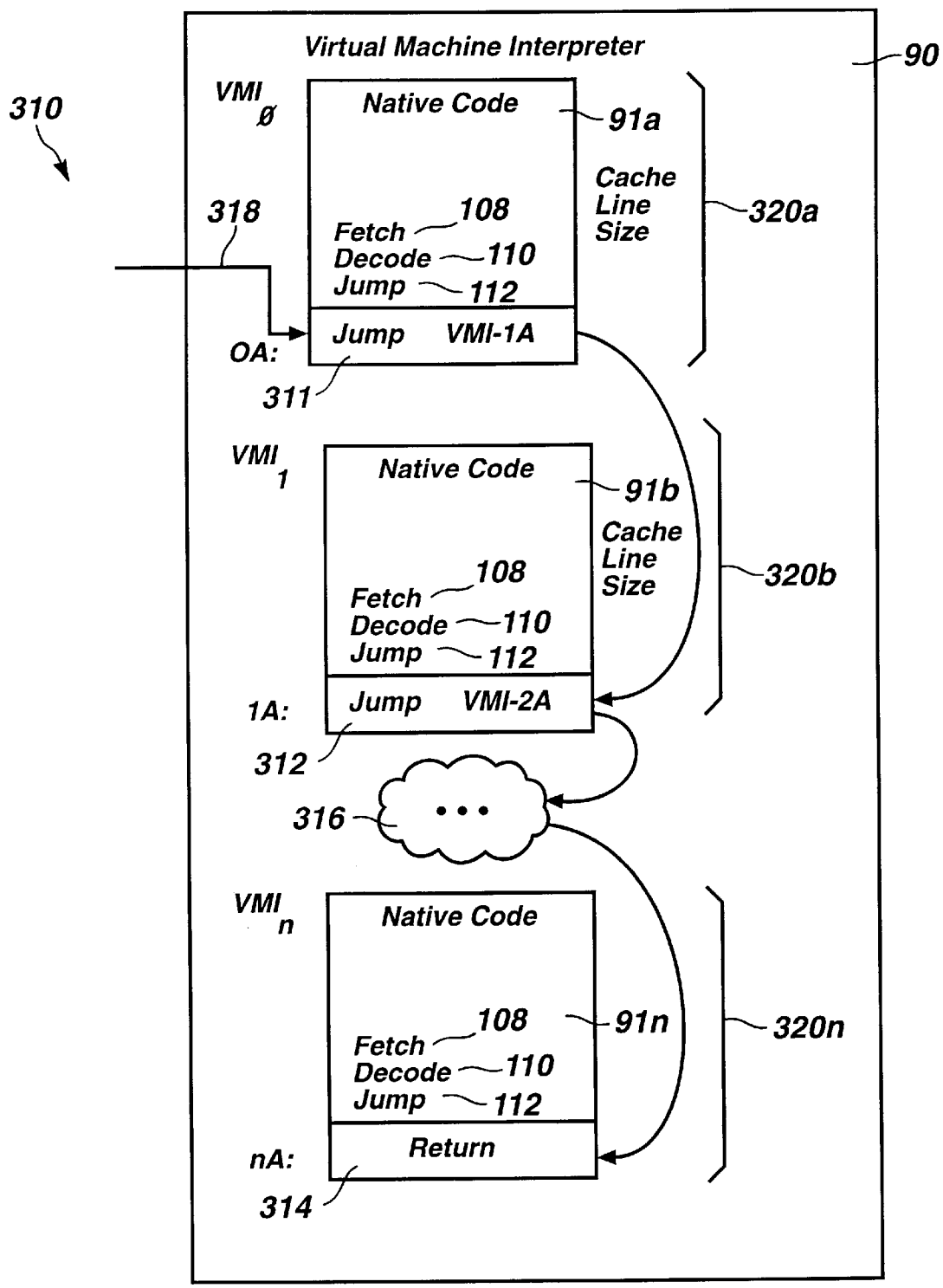
FIG. 10 is a schematic block diagram of data structures associated with a virtual machine, illustrating a burst-loading process for inducing the operating system to load a series of executables without having to read or execute any substantive machine code within the individual executables.

Referring to FIG. 10, in one embodiment, an interpreter such as an interpretive machine interpreter 90 may include a set of interpretive instructions 91 aligned to form a virtual machine program 130. Each interpretive instruction 91 represents a series of native code commands for implementing in a processor 12 one or more commands of a high level language which may not have been compiled or assembled for the hardware platform corresponding to the processor 12. Accordingly, each interpretive instruction 91 is taken in logical order, executing the corresponding interpretive instruction 91 that implements the virtual machine instruction 91. As a part of the native code instruction 91 or code snippet 91 (e.g. 91a, 91b, 91n), the processor 12 will execute the machine level instructions in the virtual machine instruction 91, before executing a fetch 108 of a next virtual machine instruction 91. The next virtual machine instruction 91 to be fetched 108 will have been determined logically by the order of the instruction 132 of the program 130. Accordingly, the fetch 108 will bring up an appropriate virtual machine instruction 91 in machine code.

The decode instruction 110 determines the operation to be executed 72, after which a jump instruction 112 directs the processor 12 to the next virtual machine instruction 91 to be executed.

In an apparatus and method in accordance with the invention, a PC-relative jump 310, 312 may be referred to generally as a jump 310. Each jump 310 identifies a location to which execution of the processor 12 is to proceed. The jump 310 may be thought of as instructing the processor 12 to jump to an address identified by the jump instruction 310. Thus, the jump 310 of FIG. 10 identifies a next virtual machine instruction to which execution 72 is to proceed in the processor 12.

In one presently preferred embodiment, a jump command 310 is placed at the end of every interpretive instruction 91. The jump command 310 identifies the next interpretive instruction 91 in a selected logical order. Thus, the virtual machine instruction 91a comprises a jump command 311 that identifies the interpretive instruction 91b, which in turn, comprises a jump command 312 that identifies the next interpretive instruction 9 in as the next address to which execution will proceed.

Current MMUs 225, including cache management units in processors 12 are extremely proficient at identifying addresses, automatically loading required instructions and data, and executing the instructions and data with a low latency time between loading of instructions. Thus, for example, when a pointer directs execution to an individual native code instruction 106 within an interpretive instruction 91, the MMU 225 will determine whether or not the native code instruction 106 is found within a cache line 140 currently cached in the processor cache 60. If the native code instruction 106 is not present, then the cache 60 "misses," and a cache line 140 at a logical (virtual) or physical (real) address, together with the entire cache line or block 114 in which the native code instruction 106 is found is loaded into the cache 60.

In one embodiment of the present invention, the interpretive instructions 91 are carefully crafted to fit within an individual cache line 140, as described above. In one embodiment of an apparatus and method in accordance with the present invention, each of the interpretive instructions 91, with corresponding jump instruction 310 embedded therein, are written to fit within and occupy a single cache line 140.

The virtual machine 90 may be viewed as a series of interpretive instructions 91. Under the embodiment of FIG. 10, a jump instruction 310 is placed as the last native code instruction 106 in each interpretive instruction 91. An exception is made for the last instruction 91n. The last instruction 91n in the virtual machine 90 may be provided with a return 314 to return to the location from which the first interpretive instruction 91 was called.

Thus, the first interpretive instruction 91a (VMI$_0$) corresponds to a series of native code instructions 106. Similarly, a second interpretive instruction 91b (VMI$_1$), contains another series of native code instructions 106 and is preferably stored logically adjacent in the memory device 20. Additional intermediate interpretive instructions VMI$_{2-(n-1)}$, shown at 316, are also in successive order. A last interpretive instruction 91n (VMI$_n$) is placed at the end of the interpretive instructions 16.

The jump instructions 310 may be referred to as augmented instructions 310 or augmentations 310. Accordingly, each augmentation may be referred to by a capital letter "A". Thus, in FIG. 10, the individual jump instructions 310 in machine code are identified by a numeral associated with the virtual machine instruction 91, and a capital letter "A" indicating the augmented or augmenting instruction 310.

The interpretive instructions 91 augmented by the additional jump instructions 310 and the return instruction 314 may also be referred to as code snippets or augmented virtual machine instructions (VMIs) 320. The augmented VMIs 320 are preferably crafted to fit within a single cache line 140. Thus, the code snippets 320a, 320b, and so forth up to the last code snippet 320n, will each be programmed to fit individually on an individual cache line 140.

Thus, a code block 114 associated with each code snippet 320 can be addressed by a jump instruction 310, or by an original incoming request 318. In order to quickly load the virtual machine 90, an original incoming request 318 is directed to the initial jump instruction 311. Accordingly, the incoming request 318 directs execution of the processor 12 to the address corresponding to the jump instruction 310. The address corresponding to the jump instruction 310 points to a location within a particular block 114 of main memory 20. The block 114 is sought after by the MMU 225. The MMU 225 will determine whether or not the cache 60 already contains the block 114 associated with the jump instruction 310.

If the correct block 114 is not present within the cache 60, as is typical when first loading the virtual machine 90, a cache miss is registered, and the MMU 225 proceeds to load the entire block 114 of main memory 20 that contains the called jump instruction 310 into a cache line 140 of the cache 60. As discussed, each augmented code snippet 320 is sized to fit within any single block 114.

Accordingly, the result of the incoming request 318 pointing to the jump 310 is that an entire cache line 140 is loaded with the block 114 of main memory 20 containing the entire augmented VMI 320a. In so doing, because the processor 12 does not load any of the other native code instructions 106, only the jump instruction 310 is executed. Thus, the MMU 225 may efficiently load the augmented VMI 320, without executing any of the native code in the interpretive instruction 91. Accordingly, loading of the VMI 320 is much faster than it would be if the native instructions within the interpretive instructions 91 were executed.

Subsequently, because jump instruction 311 identifies a logically successive jump instruction 312, associated with a logically adjacent interpretive instruction 91b in the virtual machine 90, the MMU 225 searches for the jump instruction 312, registers a miss, and loads a block 114 of main memory 20 containing the jump instruction 312 into a cache line 140. This block 114 contains the VMI 320b, which is sized to occupy a line 140 of the cache 60. The processor 12 executes the jump 112, which in turn identifies a successive jump instruction 310 in an interpretive instruction 316. This process continues until the final augmented code snippet 320n has been loaded into a line 140 in the cache 60, at which time the jump instruction 314 returns control to a calling instruction, typically of the main program.

Thus, through the inventive inclusion of the jump instructions 310 within the interpretive instructions 91, only the very efficient jumps 310 and the return 314 are executed. Nevertheless, the MMU 225 loads every augmented code snippet 320 and associated native code instructions 106 into a cache line 140.

Accordingly, each execution 318 results in a very rapid loading of a block 114 into a cache line 140. In this manner, every interpretive instruction 91 is loaded in sequence into the cache 60. In as much as any particular interpretive instruction 91 is sufficiently short that an augmented instruction 310 may be added to the end of it without exceeding the length 80 of a cache line 140, the entire augmented instruction 320 can be loaded "instantly." Preferably the cache has sufficient cache lines 140 to accommodate the entire virtual machine 90.

If the entire virtual machine 90 is loaded into the cache 60, no page faults will occur during execution. Accordingly, as discussed above, the cache 60 may then be pinned to maintain the virtual machine 90 in the cache 60 until all executions of instructions 91 in the virtual machine 90 required by the program 130 are completed.

The rapid loading by the MMU 225 of each of the augmented code snippets 320 in order, executing only the individual jumps 310, and the ultimate return 314, requires no interpretation, no substantive execution, and occurs in a "burst" of activity amounting to pointing followed by the MMU 225 searching, not finding, and loading all of the VMIs 320 in order. Accordingly, the virtual machine 90 may be quickly be swapped in and out of the cache 60.

Additionally, no test instructions are required to manipulate the interpretive instructions 91 into the cache 60, as would normally be required by any manipulation of the cache. Instead, the MMU 225 with its "hard-wired", blazingly fast execution, is "tricked," so to speak, into loading the virtual machine 90 in a burst of normal overhead processes. MMUs 225 are optimized to perform such functions in extremely fast secession, as compared with the execution of even the fetch 108, decode 110, jump 112, and other native code executions 106 in the substantive portion of individual code snippets 91.

Burst-loading of a cache 60, 66 may typically include providing a virtual machine 90 composed of individual interpretive instructions 91. Each virtual machine instruction 320 may then be provided with a jump instruction 310 identifying a next, proximate interpretive instruction 91. Each interpretive instruction 91 with its jump instruction 310 is programmed to fit within a single block 114 suitable for caching in a single line of a cache 60, 66. Thereafter, an incoming request 318 is executed, identifying the jump instruction 310 of the first interpretive instruction 91a for execution.

To summarize the discussion of FIG. 10, each subsequent jump instruction 310 associated with each subsequent interpretive instruction 91b through the last instruction 91n will identify, point to, or otherwise cause ajump 312 and execution of the jump instruction 312 of the next interpretive instruction 91 in order. A return 314 associated with the last native code interpretive instruction 91n returns the processor to the original calling routine responsible for the incoming request 318. Meanwhile, the MMU 225 responsible for managing the cache 60, 66 loads in rapid secession each augmented code snippet 320 in order, as quickly as the individual jump instructions 310 are executed.

Accordingly, the cache 60, 66 is burst-loaded without resort to test instructions, and without even resorting to execution of a mock code 90 comprised of each of the interpretive instructions 91 in the entire virtual machine 90. That is, as discussed above, the mock code 90 may be written. However, the mock code may need not even be executed. Moreover, since each native code snippet 91 or interpretive instruction 91 contains substantive instructions, the fast load 224 (see FIG. 7) can be done, but may be superceded, in one embodiment of an apparatus and method in accordance with the invention, by the burst-loading approach identified herein.

Figure 11:
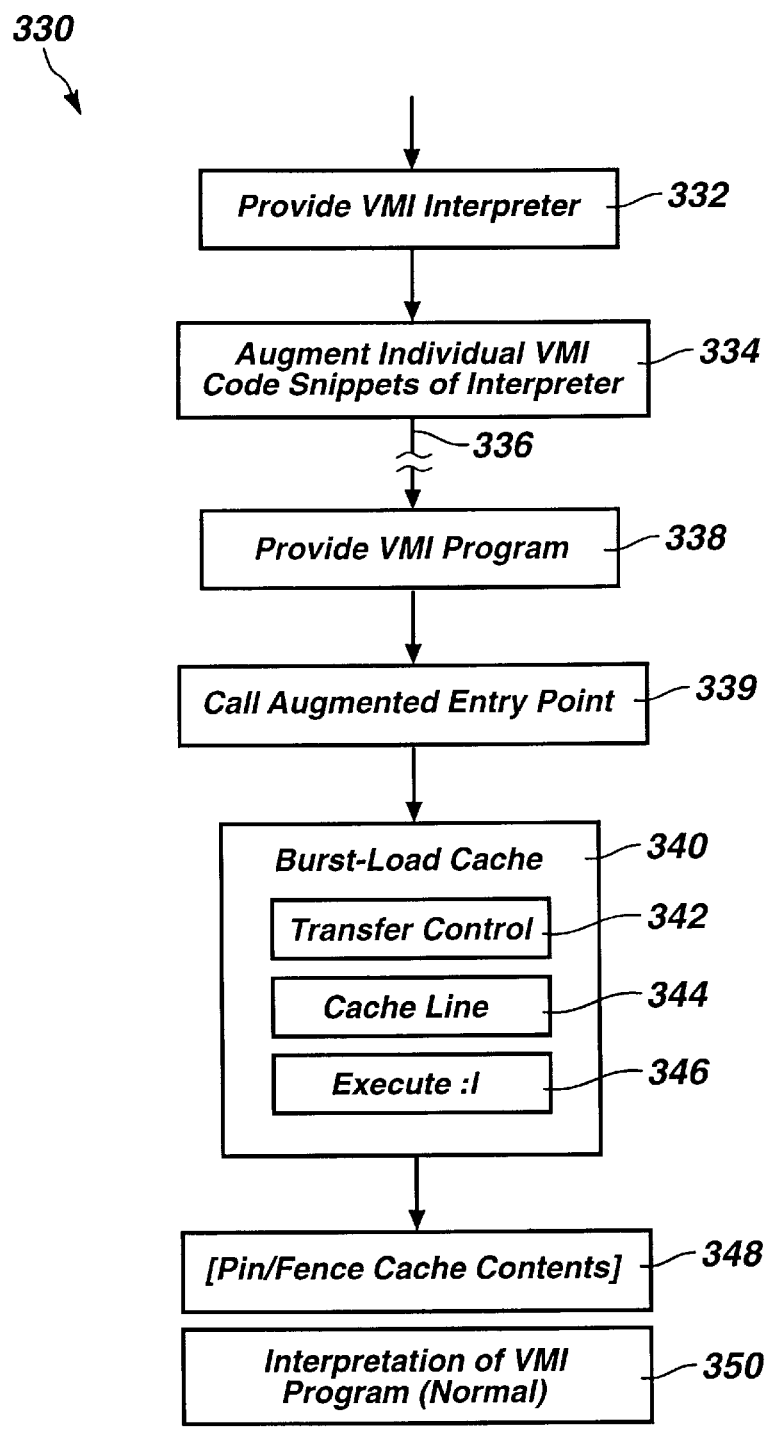
FIG. 11 is a schematic block diagram illustrating a method for burst a set of individual executables within a cache.

Referring to FIG. 11, a method 330 or burst-loading 330 is illustrated. In one embodiment of a method 330 and apparatus 10 in accordance with the invention, a provide step 332 may provide a virtual machine interpreter 90. The virtual machine interpreter 90 may be provided with a series of individual instructions 91 coded in a native machine code appropriate to a processor 12 or execution by an execute unit 72. Each of the interpretive instructions 91 may be written, and is preferably written to fit within a single line 140 in a cache 60, 66 adapted to receive the interpretive instructions 91 for loading into the processor 12. Moreover, in presently preferred embodiment, each of the interpretive instructions 91 may be programmed to be sufficiently short as to leave additional space for ajump instruction 310.

An augment step 334 may augment the individual interpretive instructions 91 individually. Each interpretive instruction 91 is modified to add a PC-relative jump instruction 310. Each jump instruction 310 is programmed to point to an augmentation location 311, 312, 314 corresponding to a next, adjacent, virtual machine instruction 91, and specifically to a next augmented instruction 311, 312, 314 within a next augmented VMI 320a, 320b, 320n, etc. Thus, each interpretive instruction 91 is augmented with a PC-relative jump instruction 310 pointing to a next jump instruction 312 augmenting a next interpretive instruction 91.

Each of the jump instructions 310, 312, as well as any return 312 identified with a last, augmented VMI 320n, is programmed to leave each respective augmented VMI 320 of a length suitable for fitting within a single cache line 140 in the processor cache 60, 66. Operation of data caches 62, 68 and contents thereof remain unaffected by the burst-loading method 330.

A continuation or path 336 in the method 330 progressing toward a provide step 338 may occur over any period of time. For example, the continuation 336 may occur moments, days, or years after the augment step 334. Eventually, in order to benefit from the burst-loading method 330, a provide step 338 results in creation of a virtual machine program 130. A virtual machine program 338 is made up of programmed instructions 132 written in the language of the interpretive instructions 91. Thus, the provide step 338 provides a program, programed by a user or programmer with a line of the interpretive instructions 91 of the virtual machine 90 to execute some desired function.

A call step 339 may also occur at a time distinct from the provide step 338. As a practical matter, the purpose of the provide step 338 is to provide an executable 130 to a user or to others effective to provide the benefit of the processing capability of the processor 12. Thus, the call 339 may be executed at the time that a call is made by a computer application accessing the routine 130 or application 130. As a practical matter, since interpreted programs 130 may not be the only programs operating on a processor 12, one appropriate approach is to execute the call 339 only when a call is made or immediately in response to a call invoking execution of a virtual machine program 130. Whether loaded prior to calling the virtual machine program 130 or in response to the call to virtual machine 130, a call 339 directs execution of the processor 12 to the request 318 and subsequent execution 322a of the jump instruction 310 of the burst, augmented machine instruction 320a in the virtual machine 90.

A burst-load step 340 occurs next, in which the cache 60, 66 is preferably burst-loaded with the entire set of interpretive instructions 91 of the virtual machine 90. In one embodiment, the burst-load 340 may include a transfer 342 of control of the processor 12 to the jump instruction 310. The MMU 225 in response to the call 318 or request 318 for the jump instruction 310 immediately caches 344 the line 140 of the cache 60, 66. Alternatively, one may think of the cache 344 step as caching the block 114 corresponding to the interpretive instruction 91a in the cache line 140 of the cache 60, 66. The execute step 346 is then completed by the execute unit 72 of the processor 12, executing 322a the jump instruction 310.

The transfer 342 of control, the caching 344 of the block 114 in the cache line 140, and the subsequent execution 346 of the jump 310 in order to execute 322a or jump 322a to the next augmented instruction 312, are repeated until the return 314 completes the burst-load 340 of the cache 60, 66.

The pin step 348 may be conducted next. Nevertheless, in certain embodiments, the cache 60,66 may not be pinned with the virtual machine 90 as contents therein. For example, the pin step 348 may be replaced with a fence step 348 or fencing step 348. In fencing, the cache 60, 66 is not pinned. Instead, controlling bits in the page descriptors of memory pages in the memory device 14 are set. The caching control bits are set to disable caching in all code, or all pages containing code within a memory device 20 of an apparatus 10. At the same time, the cache-controlling bits associated with pages corresponding to the virtual machine 90, or the interpretive instructions 91, 320 of the virtual machine 90 are set to enable caching.

Because pages corresponding to code not associated with the virtual machine 90 are all set to disable caching, only the pages containing the interpretive instructions 91 can be cached. The virtual machine instructions 91, 320 are free to be cached on demand. Thus, since the request 318 has loaded the cache 60, 66 with the entire virtual machine 90, a fencing step 348 simply renders the cache 60, 66 "hands-off" to all pages not associated with the virtual machine.

With the interpretive instructions 91 available, interpretation 350 of the virtual machine program 130 may proceed normally. Interpretation 350 proceeds sequentially through the instructions 132 in the logical order defined by the program 130. As each instruction 132 requires execution of one of the interpretive instruction 91, the MMU 225 of the processor 12 checks the cache 60, 66 for the presence of the proper instruction 91. By virtue of the burst-load 340 and either pinning 348 or fencing 348 the contents 80 of the cache 60, the proper instruction 91 is always found available at an appropriate line 140 of the cache 66, 66. Thus, the interpretation 350 of the virtual machine program 130 is extremely fast.

Figure 12:
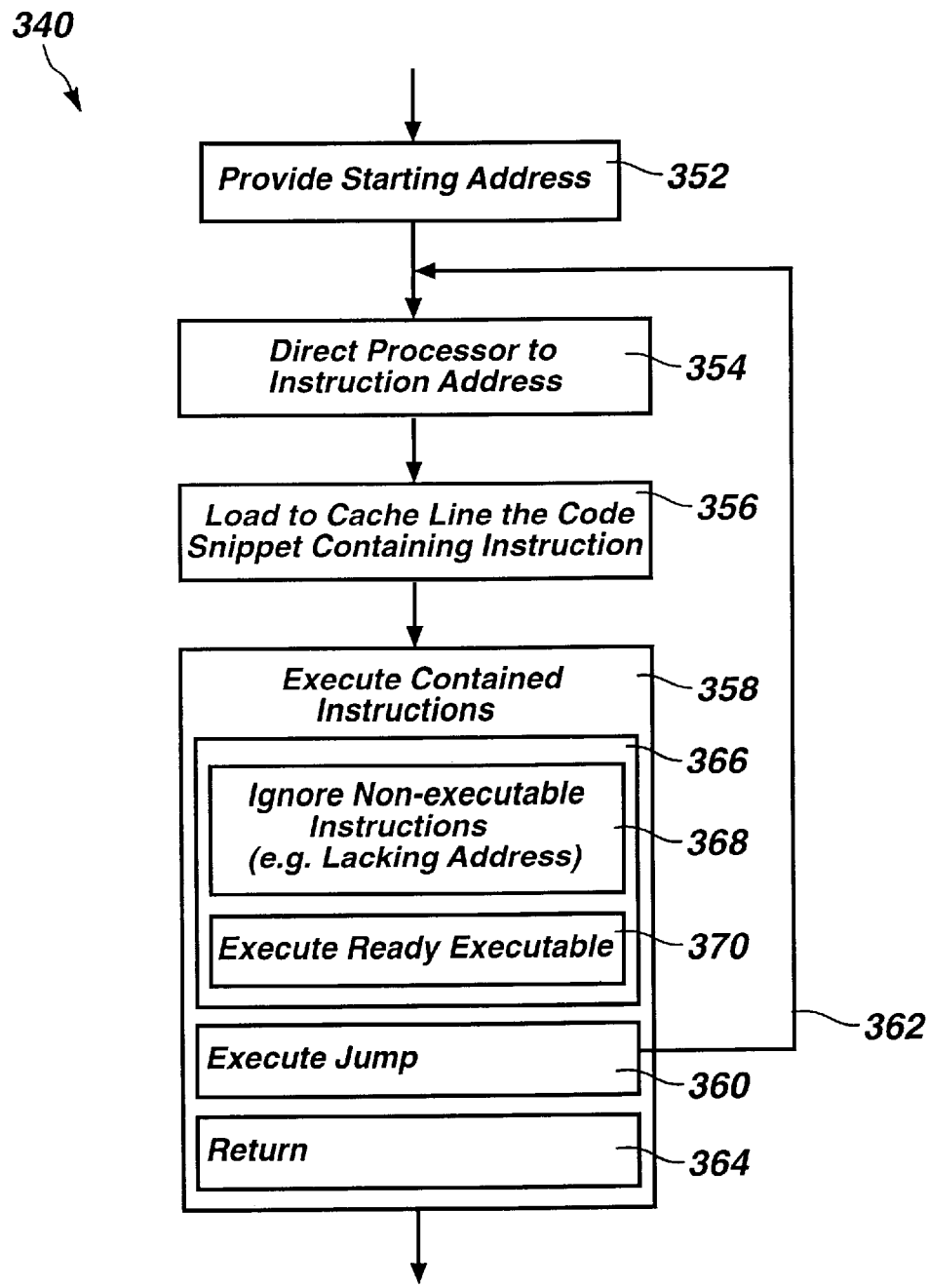
FIG. 12 is a schematic block diagram illustrating in more detail one embodiment of a burst-loading method of FIG. 11.

FIG. 12 illustrates one embodiment of a method 340 for accomplishing a burst-load 340. In the embodiment of FIG. 12, a provide step 352 provides a starting address. For example, the request 318 may point to the jump instruction 310 corresponding to the first instruction 91a. Thereafter a direct step 354 directs the processor 12 to an instruction address corresponding to the instruction 310 in the interpretive instruction 91. Perhaps more properly, the direct step 354 directs 318 execution by the execute unit 72 to the address corresponding to the jump instruction 310 of the augmented virtual machine 320a.

A load step 356 loads a code snippet 320, augmented with a jump instruction 310 in accordance with the present invention, into a cache line 140. Typically, this is conducted by the MMU 225, as discussed above.

An execute step 358 executes the contained instruction 310. As a practical matter, the execute step 358 causes a jump 322 (in FIG. 10) between jump instructions 310. Thus, the execute jump step 360 corresponds to the execution 322a of the jump instruction 310 corresponding to the augmented VMIs 320. However, in one embodiment, the request 18 or the direct step 354 need not identify the jump step 310 alone, nor need the jump step 310 be the very last instruction in the augmented code snippet 320.

As a practical matter, the jump 112 in the interpretive instruction 91 is to be used after the substantive portion of the interpretive instruction 91 is executed. Accordingly, the jump instruction 310 may be placed at the end of the augmented code snippet 320 in order to prevent the jump instruction 310 from being executed by the processor 12 at any time during actual execution of a virtual machine instruction program 130. However, in the event that a jump instruction 310 is actually associated with other instructions proceeding it, the jump instruction 310 would be ignored by the processor 12, because executable instructions that have no addresses with their opcodes become non-executable instructions.

Accordingly, as indicated at 368, the processor 12 will ignore non-executable instructions. As indicated at 370, ready executables such as the jump instruction 310 are executed. Thus, an execution 366 could be completed in response to a request 318 or a direct step 354 pointing to any location within a virtual machine 91. Since none of the substantive instructions in the interpretive instructions 91 have addresses, and are nonfunctional, the only executable instruction for the actual processor 12 is the jump instruction 310 at the end of the individual code snippet 91, or more properly, the augmented virtual machine code snippet 320.

In one presently preferred embodiment, the request 318 made during the direct step 354 directs the processor 12 immediately to a jump instruction 310 or the return instruction 314, in the case of every interpretive instruction 91, 320. Thus, the optional execution 366 need not occur, and the execute step 360 involves only execution by the processor 12 from the virtual machine 90.

Necessarily, the execute jump step 360 is followed by a loop 362 by virtue of identifying an address of a next jump instruction 312. Thus, the execute step 360 loops to a continuing direct step 354 upon each successive jump instruction 310 until the final jump instruction 314 is encountered. The final jump instruction 314 is a jump operation and results in a return step 364 in which the process 12 returns control to the calling routine that executed the provide step 352.

Also in the embodiment of FIG. 12, an interpreter 90 may be executed in a usermode, while remaining capable of loading and pinning 250 the interpreter 90 by a system mode command.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. An apparatus comprising:
   a processor operably connected to the memory device for executing machine code instructions;
   a processor cache; and
   a memory device for storing instructions executable by a processor, the memory device storing a plurality of native code instruction sets executable by the processor, the native code instruction sets each being sized to occupy a line within the cache and containing a jump instruction pointing to a jump instruction in a successive set of native code instructions, the final jump instruction comprising a return instruction.

2. The apparatus of claim 1, wherein the native code instruction sets are each an interpretive instruction for allowing the processor to operate in an interpretive environment.

3. The apparatus of claim 2, wherein the interpretive instructions each comprise a virtual machine instruction, the virtual machine instructions together forming a virtual machine.

4. A method for burst-loading a processor cache, the method comprising:

providing a virtual machine interpreter containing a plurality of interpretive instructions executable by a processor for effecting programed instructions provided in an executable in a virtual machine code;

augmenting each of the interpretive instructions to include therein a jump instruction pointing to a logically adjacent virtual machine instruction; and directing with a virtual machine program written in virtual machine instructions execution of the processor to an augmented entry point corresponding to an augmented instruction associated with a virtual machine instruction.

5. The method of claim 4 when the virtual machine instruction is augmented with a jump instruction corresponding to the augmented entry point, the method further comprising execution of a jump instruction to a proximate virtual machine instruction in response to the augmented instruction; jumping repeatedly by the processor 12 to execute additional augmented instructions corresponding to a plurality of virtual machine instructions.

6. The method of claim 5 further comprising jumping by the processor 12 to all virtual machine instructions comprising the virtual machine.

7. The method of claim 6 further comprising returning control to the processor to a routine originally responsible for directing execution of the processor to the first augmented jump instruction.

8. The method of claim 4 further comprising loading each virtual machine instruction into a processor cache in response to the direction of the processor to execute the augmented instruction.

9. The method of claim 8 further comprising pinning the virtual machine instructions in the processor cache.

10. The method of claim 8 further comprising fencing pages not corresponding to the virtual machine out of the processor cache.

11. The method of claim 8 further comprising executing the virtual machine program.

12. The method of claim 8, further comprising executing the virtual machine program relying virtually exclusively on virtual machine instructions interpreted by code resident in the processor cache.

13. A method for burst-loading a processor cache providing an address corresponding to a machine-level instruction within a virtual machine instruction, the method comprising:

directing a processor to execute the instruction corresponding to the starting address;

loading by a memory management unit corresponding to a processor cache a virtual machine instruction, corresponding to the starting address into the processor cache; and executing the machine-level instruction corresponding to the starting address to effect a jump to another starting address; continuing the process from the other starting address until all virtual machine instructions are loaded into the processor cache.

14. The method of claim 13 further comprising returning control to a calling routine responsible for providing a starting address.

15. The method of claim 14 further comprising the processor cache to maintain the contents thereof unchanged.

16. The method of claim 14 further comprising fencing pages in memory to preclude caching of executables in the processor cache, exclusive of executables corresponding to the virtual machine instructions loaded into the processor cache by the burst-loading process.

17. A memory device storing executable and operational data structures for controlling execution of a processor, and for being consumed by the processor, respectively, the data structures comprising; a virtual machine instruction written in machine code effective to be processed by a processor; augmenting instruction corresponding to the virtual machine instruction, and associated therewith in a data block suitable for loading into a memory device for execution by the processor; the augmenting instruction being programed to be effective to direct execution of the processor to jump to another augmenting instruction corresponding to another virtual machine instruction; and a pointer effective to direct execution of the processor to the augmenting instruction.

18. The memory device of claim 17, wherein the data structures further comprise a plurality of virtual machine instructions, each augmented to have a corresponding augmenting instruction associated therewith and effective to be stored in a memory block of the memory device, to be inseparably associated with the corresponding virtual machine instruction.

19. The memory device of claim 18, wherein the augmenting instructions each comprise a jump instruction, effective to direct execution of a processor to a jump instruction corresponding to an adjacent virtual memory instruction, and wherein execution of each said jump instruction is effective to cause the processor 12 to load the memory block into a cache line uniquely associated with the virtual machine instruction.

* * * * *

UNITED STATES PATENT AND TRADEMARK OFFICE
CERTIFICATE OF CORRECTION

PATENT NO. : 6,141,732
DATED : October 31, 2000
INVENTOR(S) : Phillip M. Adams

Page 1 of 1

It is certified that error appears in the above-identified patent and that said Letters Patent is hereby corrected as shown below:

Title page,
Item [60], Related U.S. Application Data, please delete "Mar. 24, 1998" and insert instead -- Mar. 23, 1998 --.

Signed and Sealed this

Sixteenth Day of April, 2002

Attest:

JAMES E. ROGAN
Attesting Officer    Director of the United States Patent and Trademark Office